United States Patent [19]

Wally, Jr. et al.

[11] 3,998,546
[45] Dec. 21, 1976

[54] MULTI-IMAGE REPRODUCING APPARATUS

[75] Inventors: Joseph H. Wally, Jr., Shawnee Mission, Kans.; Robert Lee Wall, Raytown, Mo.; Samuel Edward Wilson, Mission, Kans.

[73] Assignee: Filminiature Systems, Inc., Kansas City, Mo.

[22] Filed: May 5, 1975

[21] Appl. No.: 574,466

[52] U.S. Cl. .................................. 355/53; 355/18; 355/54; 355/61
[51] Int. Cl.² ....................................... G03B 27/42
[58] Field of Search .................. 355/18, 53, 54, 61

[56] References Cited
UNITED STATES PATENTS

| | | | |
|---|---|---|---|
| 1,452,077 | 4/1923 | Huebner | 355/61 X |
| 2,150,974 | 3/1939 | Huebner | 355/54 X |
| 2,376,416 | 5/1945 | Campbell | 355/61 |
| 2,378,933 | 6/1945 | Klemm et al. | 355/61 |
| 3,424,530 | 1/1969 | Leonhart | 355/18 X |
| 3,572,926 | 3/1971 | Coil et al. | 355/53 |
| 3,588,248 | 6/1971 | Freund et al. | 355/54 X |
| 3,639,054 | 2/1972 | Wally, Jr. | 355/18 |
| 3,834,811 | 9/1974 | Rathburn | 355/18 |

*Primary Examiner*—Richard A. Wintercorn
*Attorney, Agent, or Firm*—Johnson, Dienner, Emrich & Wagner

[57] ABSTRACT

Apparatus including a stepping camera, partitioning means and an operating station is disclosed in which full size images of copy successively mounted on a subject holder can be optically imposed on preselected areas of a film (or a printing plate) in a required sequence when supported on a movable platen under control of a digitally programmed indexer. The camera components including the subject holder, objective support, image mask, platen and supporting structure therefor are so structured and related as to assure accurate placement of the images on a film in a programmed sequence at high speed and in such fashion that the images are uniformly sharp and of high resolution. The camera includes interchangeable subject holders such that it is equally useful with reflection copy, transparent originals and negative or positive film.

32 Claims, 35 Drawing Figures

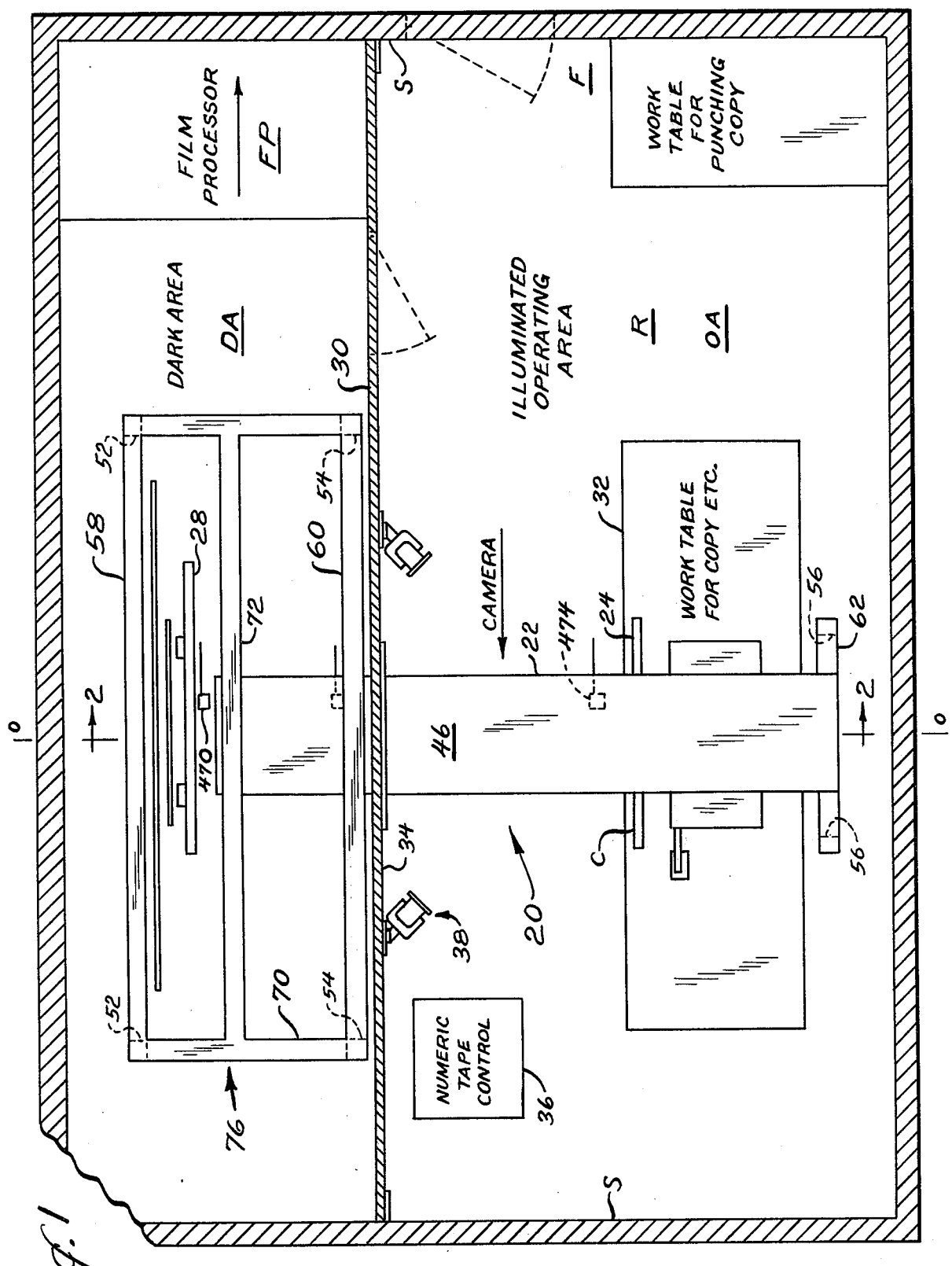

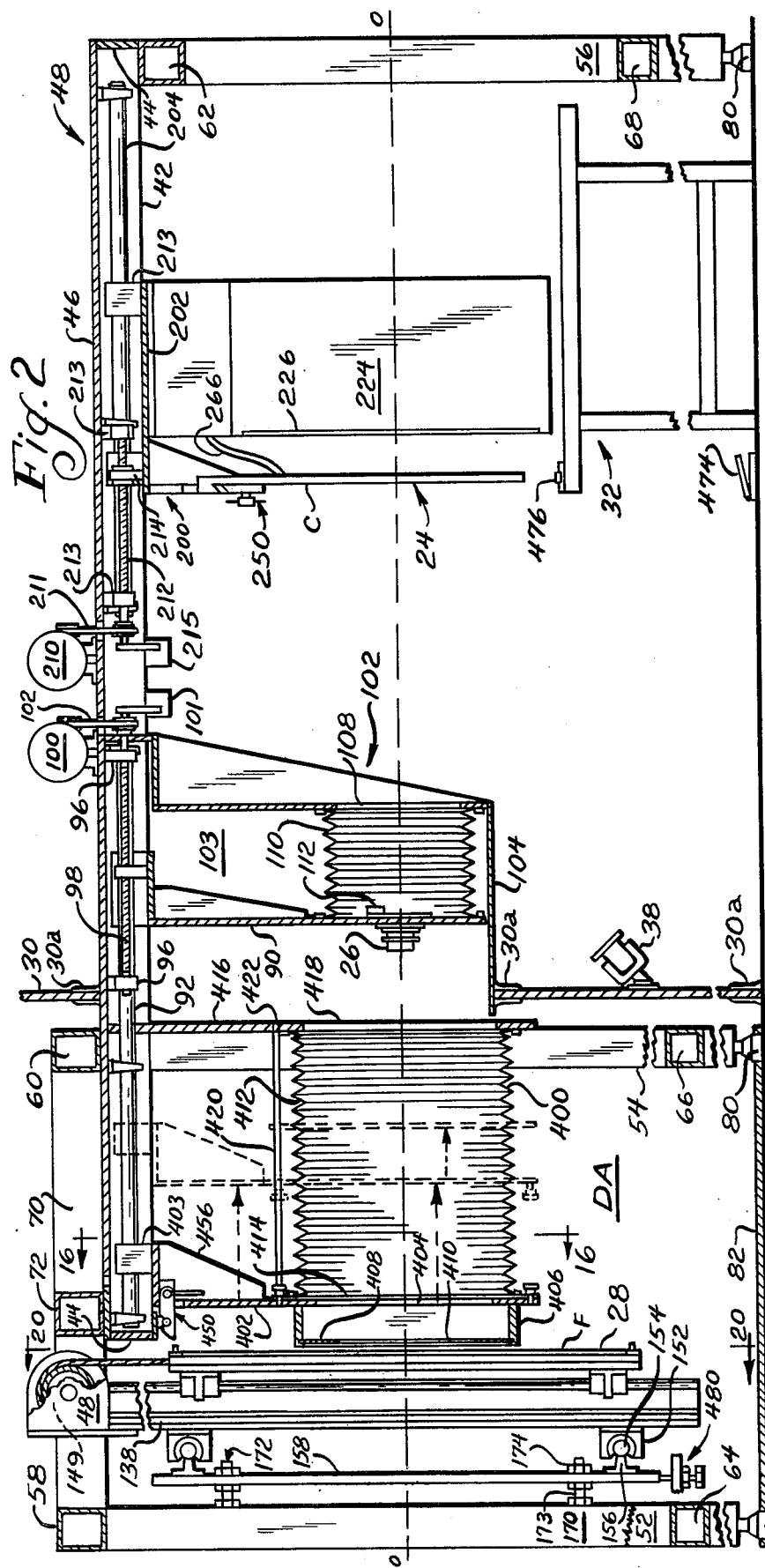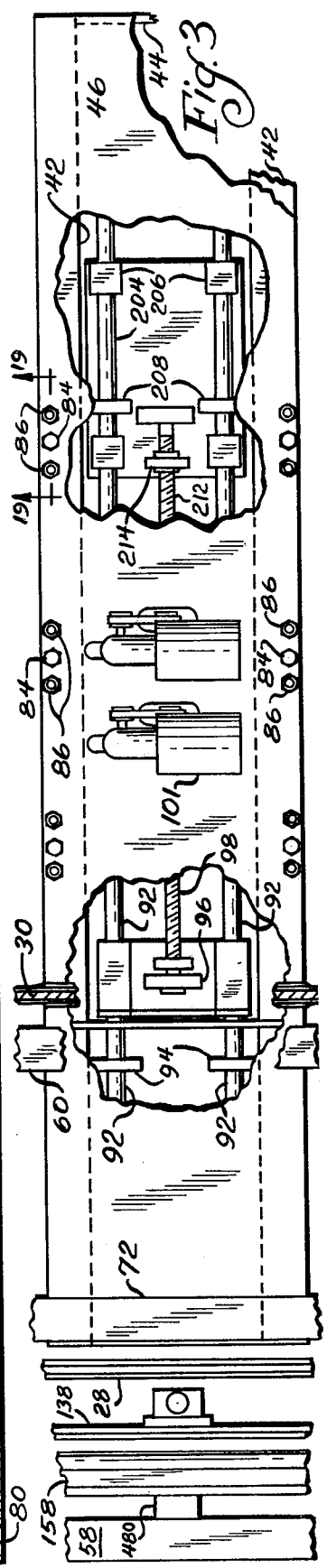

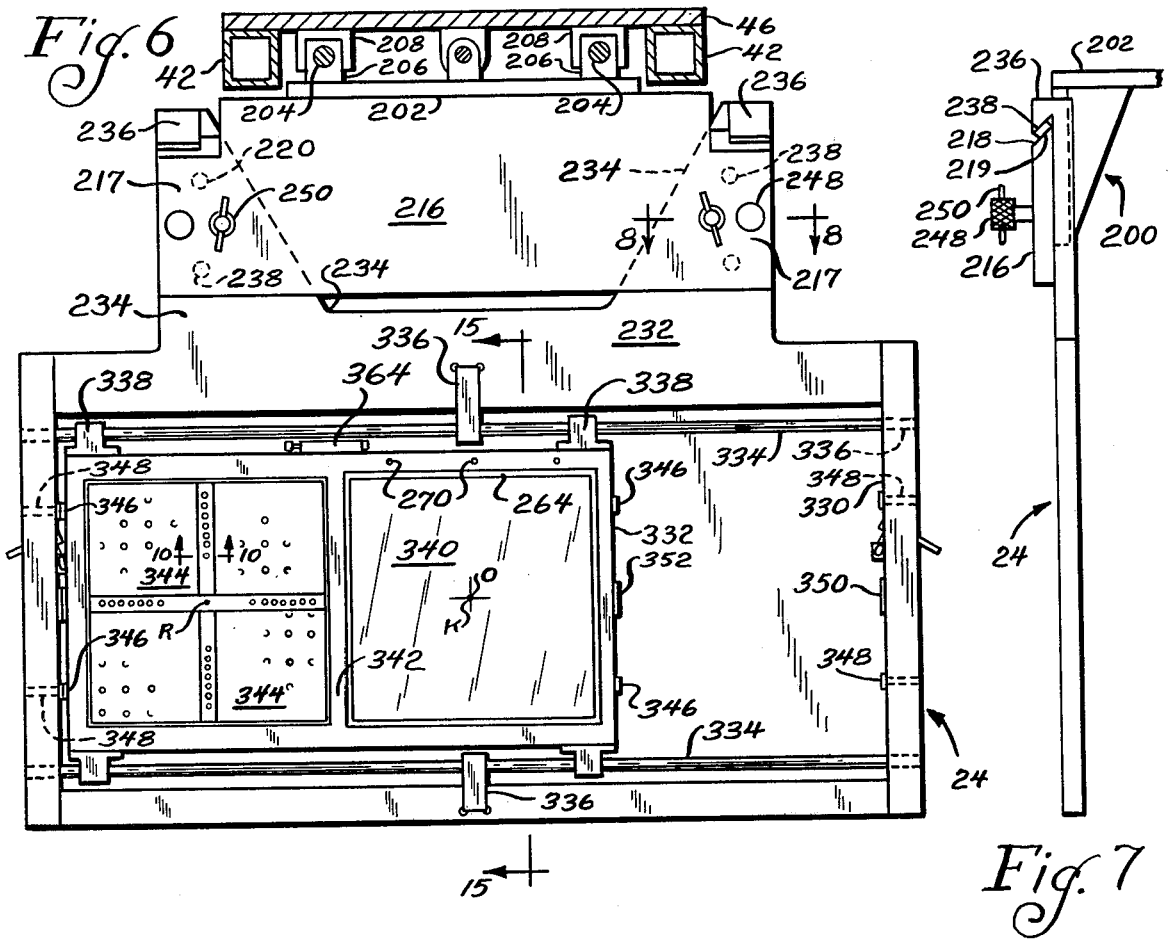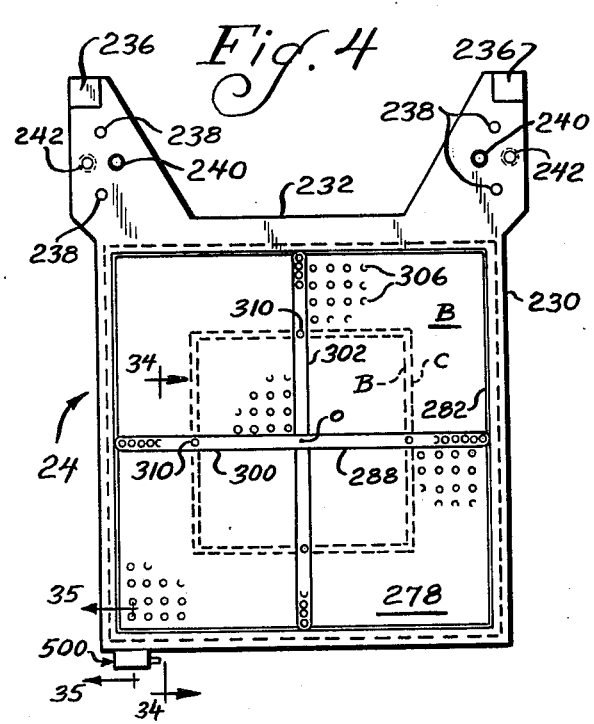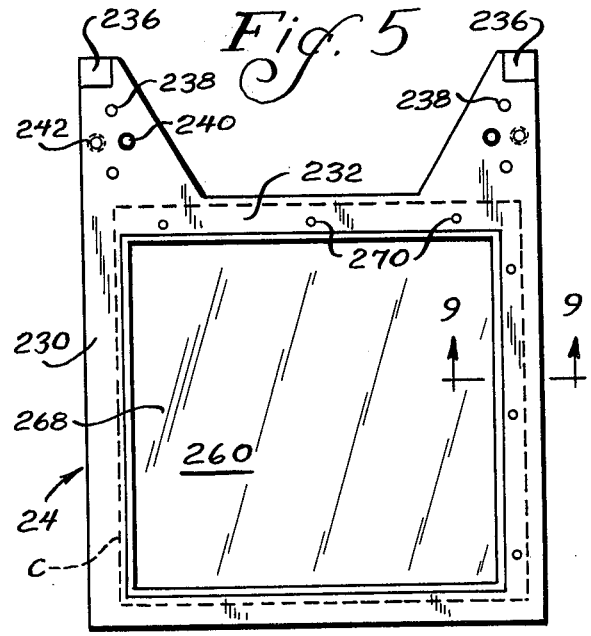

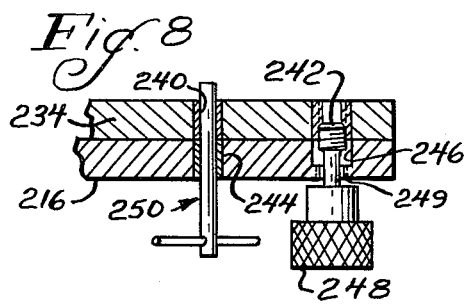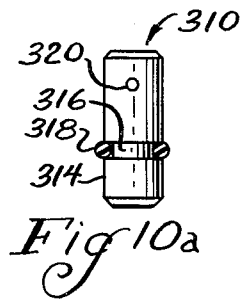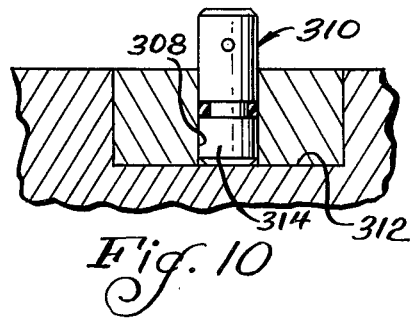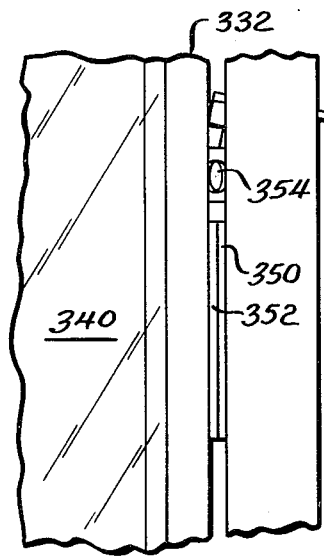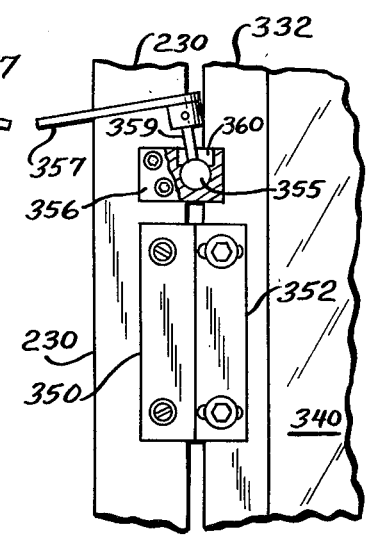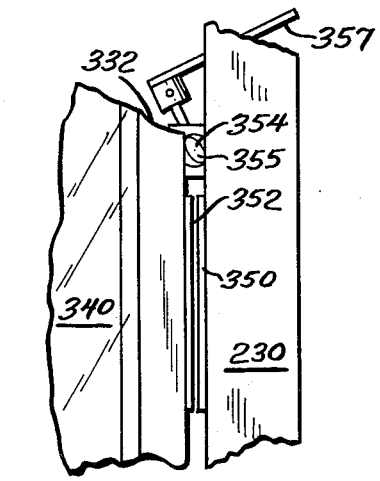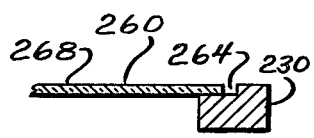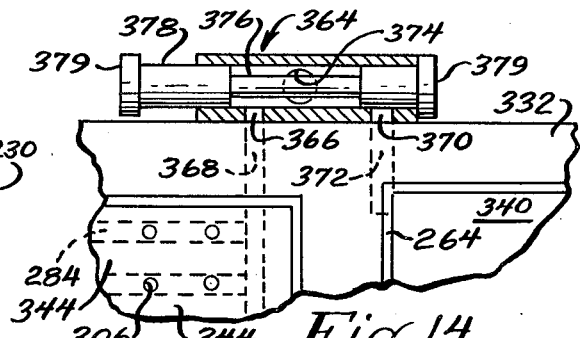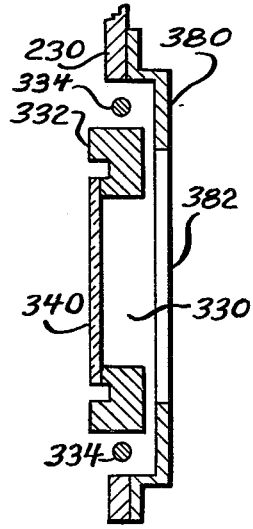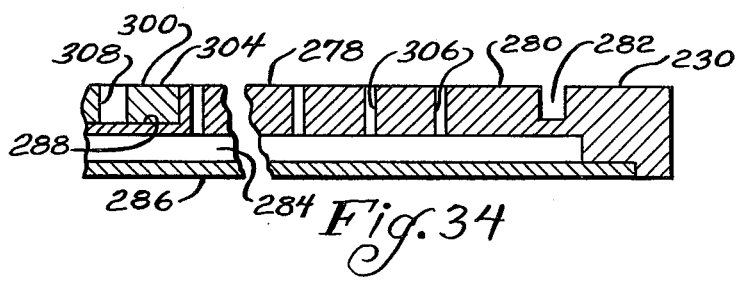

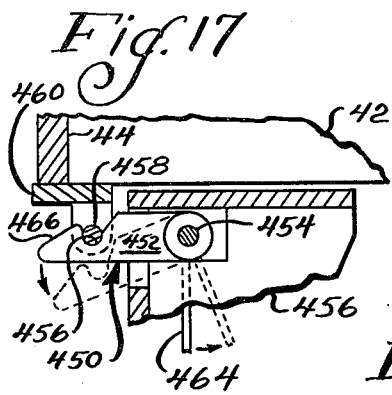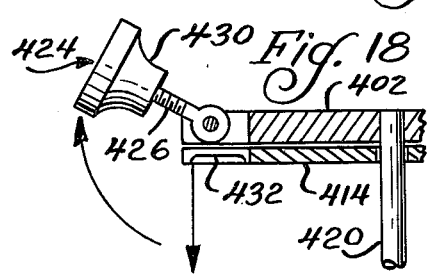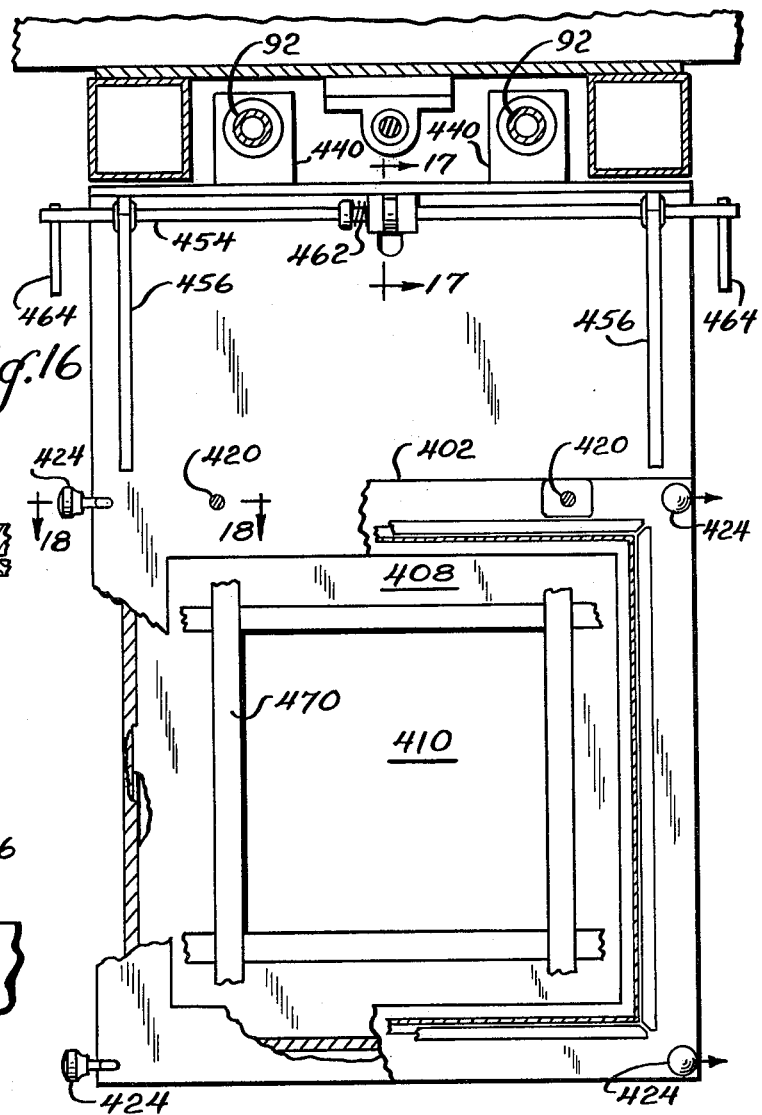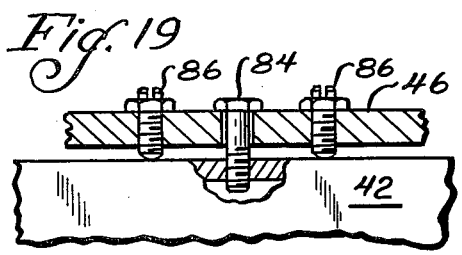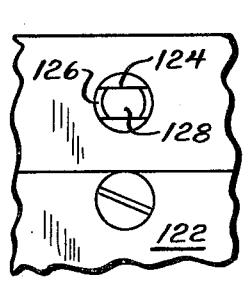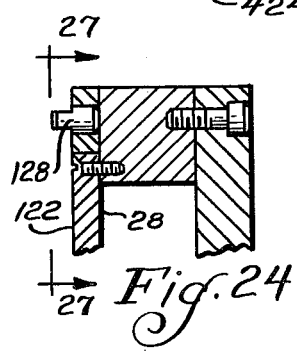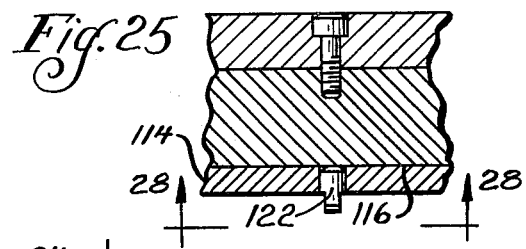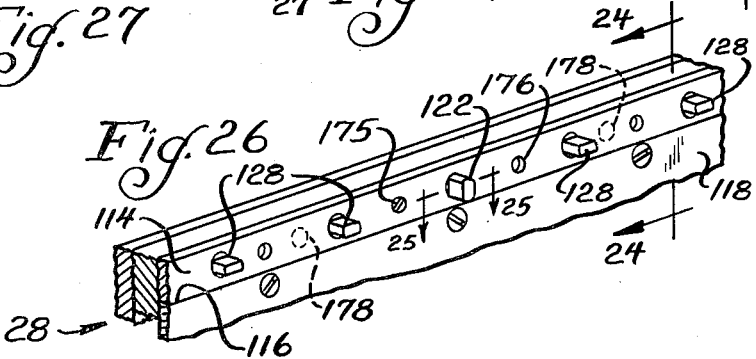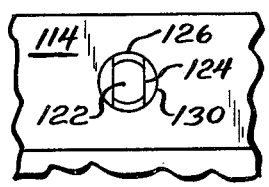

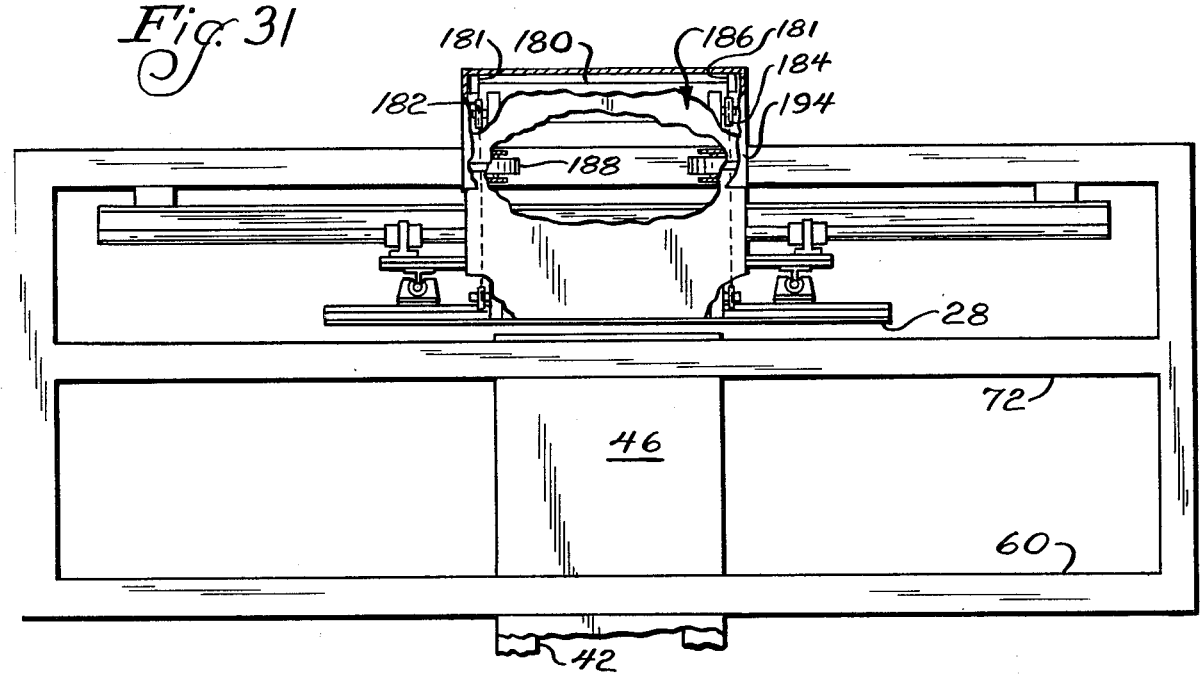
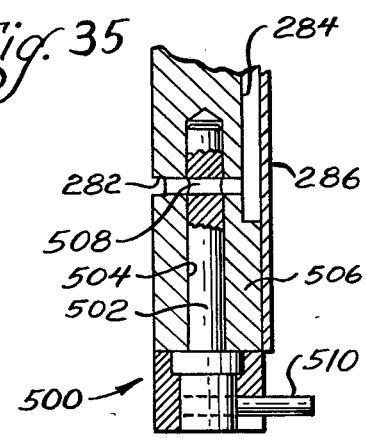
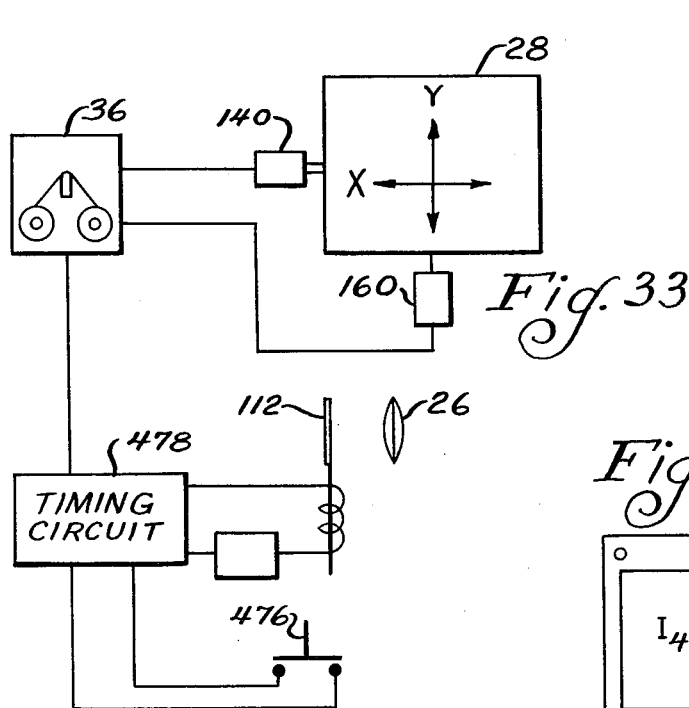
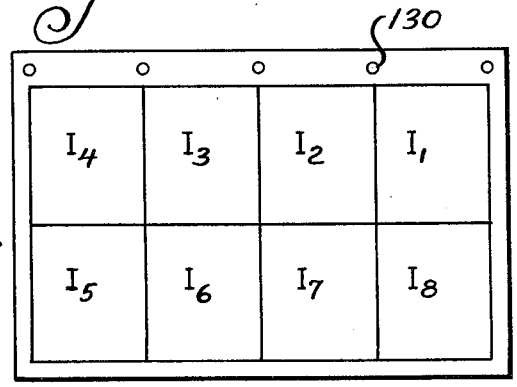

MULTI-IMAGE REPRODUCING APPARATUS

This invention relates to multi image producing apparatus employing a novel construction of stepping camera and particularly to such apparatus having novel capabilities and features for high speed automatic optical imposition of multiple images in programmed sequence on films or other carrier having a light sensitive surface, as for example a printing plate.

The invention has particular utility to the printing industry. For example, in the book printing industry it has been common to print "impositions" which comprise sheets having pages of books printed in rows and columns on both sides thereof. The pages printed on the two sides of the impositions are so arranged that the sheet may be folded and trimmed along three of its edges to constitute a "signature" which is then assembled with other "signatures" and bound together along the fourth edge to constitute a complete book. In the past it has been common practice to prepare printing plates from "film flats" by a contact printing technique. In preparation therefor these flats were constructed by laying out either original pages or film images thereof in a pattern which would place them in the proper sequence when folded into signatures. The layout was usually taped together in the negative with lithographic pressure sensitive tape and covered with light blocking paper or plastic, usually called "goldenrod." Windows were then cut in the goldenrod to reveal the individual images.

In our assignee's U.S. Pat. No. 3,837,742 which issued Sept. 24, 1974 to Joseph H. Wally, Jr., there is disclosed photoreproduction apparatus in the form of a stepping camera which is used to form the images required for one side of such an imposition in a unitary film of a size convenient for storage and handling, for example in the order of 11 × 17 inches. In said patented camera, a light-tight housing is mounted at one end of a rigidly supported horizontal base. This housing contains an axially adjustable objective and a film platen spaced therebehind which is moved in a vertical plane horizontally and vertically by means of stepping motors under the control of digitally programmed servo-systems whereby selected portions of the film platen are sequentially centered on the camera objective axis. Outside and forwardly of the housing there is located a subject holder comprising a vacuum board with registration pins spaced along the top margin thereof. In the disclosed use of said patented camera, originals of each image to comprise the imposition are mounted in the aperture of suitably punched carrier sheets which the operator locates on the subject holder using the provided registration pins so that the originals are each centered on the camera objective axis and parallel to the film supported on the movable platen. Thus the camera permits images of each page to be created in the film and in the proper position while both the original copy and image receiving portion of the film are centered on the optical axis of the camera lens, thereby facilitating production of film images of as high quality and degree of sharpness as the correction of the lens and alignment of the camera components will accommodate. The miniaturized film impositions or "flats" thus formed with the camera are subsequently enlarged to full printing size, either on film or directly onto a projection speed printing plate, utilizing an enlarging projector.

The present invention improves upon said camera of U.S. Pat. No. 3,837,742 in that it embodies apparatus making practicable automatic impositions of copy images on film or directly on the printing plate which are in the first instance at full printing size and thus eliminates the need of the enlarging projector. Filming and positioning are also combined in the single optical imposing operation so that one piece full size "flats" are produced without the use of goldenrod and tape and most of the time consuming opaquing previously required.

In accordance with the invention the film platen is vertically mounted on one of two pairs of vertical columns of a four-sided box-like reinforced structure which provides support to one end of an overhead horizontally disposed rigidly constructed rectangular frame from which the objective and subject holder are suspended in spaced parallel relation to the platen and with their axis at right angles to the plane of its film mounting surface. The opposite side of the supporting frame is supported by a third pair of vertical columns which are also rigidly reinforced by cross braces. The result is a stable and rigid supporting structure for the camera components including the aforementioned subject holder, objective and film platen which will retain the components into the aligned relationships to which they are adjusted in set up of the camera.

A feature of the invention is the novel means employed by which the film platen and the ways on which it is indexed vertically and horizontally relative to the camera axis can be precisely located on site and so that the film platen surface will be in a precisely predetermined vertical plane at right angles to the objective axis and will not move off axis as it is vertically and horizontally adjusted to bring each image portion of the film into centered relation with the objective axis.

A further feature of the invention is that both the subject holder and the objective are also supported from a one piece rigid mounting plate which is perimetrically adjustable to the overhead rectangular frame into a precise horizontal plane.

Thus a further feature of the invention is that the planar dispositions and axial movements of both the objective and of the subject holder may be precisely related to the planar disposition and vertical and horizontal movements of the film platen after on-site set up of the camera to assure that in subsequent operation of the camera each copy and image receiving portion of the film during exposure may be precisely centered on the objective axis in parallel plane and disposed at right angles to the camera axis to maximize image sharpness and resolution as well as image placement on the film.

Although not limited thereto, the invention contemplates a platen which is large enough to receive film sizes up to 42 inches × 60 inches on which can be reproduced a 38 inches × 50 inches flat or one half of a 58 inches × 77 inches flat containing four rows of four 8½ inches × 11 inches images. To accommodate centering of each of the film image portions on the camera objective axis it is necessary that the platen be movable through a substantial distance in both its horizontal and vertical directions. To accommodate these movements, the invention contemplates that the supporting structure will be located at a height under which the operator can work in an erect position close to the film platen. Partitioning means are then assembled about provided light baffles of the camera overhead supporting structure once the apparatus is set up and its components properly aligned so as to provide a walk-in dark room area at one end of the camera which contains the film platen, leaving an illuminated area at the opposite end of the camera in which the subject holder and camera controls may be contained.

It was previously known to locate the film platen of an oversize industrial camera in a room isolated from that in which the copy is set up to be photographed, allowing the former to be dark while the operator works in an illuminated area. However, a feature of this invention is that such utility is obtained without any compromise of the film and copy alignment which this invention achieves through the utilization of a common unitary support to which the camera components are each related in order to bring them into a required orientation with the other components.

Thus a further feature of the invention is that the apparatus can be precisely leveled and adjusted for proper attitude, that the movements of its indexing platen can be visually checked against each axis of the subject holder and the apparatus including its components accurately and precisely aligned before the partitioning is installed and without the partitioning interfering with said adjustments.

A further feature of the invention is that the apparatus may be utilized for filming a wide variety of copy including both reflection copy as well as transparent copy. In the accomplishment thereof, this invention utilizes interchangeable subject holders and a common fixture to which each may be removably mounted in a precisely oriented relation to the objective axis and the film platen. The fixture further includes back-lighting means with which each subject holder is aligned and which is operatable independent of and/or in conjunction with front-lighting means which also may be oriented in order to be useful with each subject holder as it is mounted in place by the supporting fixture.

Still other features of the invention include a novel construction of subject holder which facilitates precise orientation of copy through the cooperative use of a vacuum board and copy orientation pins which may be selectively located to accommodate different sizes of copy on the board.

Another feature of the invention is the provision of a subject holder having more than one copy receiving surface. In accordance with this part of the invention, the subject holder is provided with means by which each copy receiving surface may be individually precisely centered on the objective axis and then releaseably locked in said centered relation. Where one of the surfaces of such a subject holder is opaque and another is transparent, the invention facilitates mixing opaque and transparent copy with a double exposure. Thus with this invention, it is possible, with the film still in place in the camera, to first expose line copy and then to implant pre-screened half-tones into place on the same film image area, giving each an optimum exposure without compromise.

A further feature of the invention is the novel construction of the indexing platen and associated adjustable mounting means therefore which facilitate both vertical orientation of its film surface and a reference plane to which the objective axis and copy supporting surface of the subject holder is related, but also orientation of the horizontal and vertical movements of the platen in directions which precisely intersect said objective axis at right angles.

Another feature of the invention is the provision of a film supporting platen in the form of a vacuum board having film registration pins along at least one edge thereof which precisely orient the film in a centered relationship as it is drawn flat and into the vertical plane which its surface defines. In accordance with the invention, said pins are also so shaped and dimensioned that in orienting the film they also accommodate dimensional instability of the film due to atmospheric changes in temperature as well as humidity, thus allowing the film to adjust on the pins, settle, and come to rest flat against the supporting surface in response to the vacuum pull thereon and without departing from the oriented position.

Still another feature of the invention is the provision afforded for precisely orienting the registration of pins of the film platen to the subject holder and objective axis.

Another feature is the novel counterbalancing arrangement provided for taking the weight of the heavy platen off the stepping motor which drives it in its vertical direction of adjustment.

A particularly important feature of the invention is the means utilized for supporting an apertured mask over the film therebetween and the objective in order to prevent image overlap and light spill over onto adjacent image portions of the film during exposure of that film portion centered by the platen on the objective axis. In accordance with the invention, such means includes a frame in which the apertured mask is removably mounted. Such frame, in turn, is supported at one end of an expandable bellows which itself is secured to rigid light baffling means about the objective such that the image rays as they pass from the objective to the mask are shielded and illumination of the film is confined to those rays exiting through the mask aperture.

A feature of this portion of the invention is that said mask support includes latch means which locate the frame and thereby the mask immediately adjacent the film plane where it it most effective to confine the exiting light rays to the centered image portion of the film. The latch means, however, are releaseable in order to permit withdrawal of the mask supporting structure from the platen to provide convenient operator access to the platen during loading and unloading of film. When returned to the film platen, the latch means automatically relocates the mask in position.

A further feature is the provision that the bellows of the mask support may be detached from the latched frame and retracted independently of the mask toward the objective to permit a visual operator-check of the image projected by the objective through the mask aperture onto the film platen. When correctly sized, the mask aperture should not be so small as to cut off portions of the projected image; neither should it be so large as to permit image overlap on the film.

Still other features of the invention include the physical dimensioning and arrangement of the components making up the apparatus and its imaging system such that the operator has convenient and close operating access to both the subject holder and the film platen when required.

It is also a feature of the invention that the subject holder is suspended at a height where it is both convenient for the operator to load and unload copy but also facilitates locating an operating station immediately therebeneath and such that the station is adjustable axially as well as laterally of the subject holder to meet specific operator requirements. As illustrated, such a station may comprise structure in the form of a counter or a table or conventional height (around 30 to 33 inches) which provides ready operator access to copy which has been previously stacked thereon in proper sequence for loading on the subject holder. It also provides an area on which to receive the copy as it is unloaded from the subject holder, thus introducing a considerable time saving factor as well as simplifying the total copy loading and unloading task.

Many other objects, advantages as well as features of the invention will be at once apparent and/or will become apparent from the description of the embodiments of the invention which now will be described.

Referring therefore now to the drawings:

FIG. 1 is a plane view illustrating the invention embodied in a novel stepping camera and the associated components which are combined therewith to provide a device capable of optically converting separate pieces of original copy into a one piece full size flat on film or directly to a printing plate;

FIG. 2 is a vertical sectional view taken through the device along lines 2—2 of FIG. 1 looking in the direction indicated by the arrows;

FIG. 3 is a top plan view of the device and more particularly its horizontal supporting structure, portions of which are fragmented to illustrate details and arrangement of parts thereof;

FIG. 4 illustrates a first subject holder adapted for supporting reflection copy;

FIG. 5 illustrates a second subject holder adapted for supporting transparent or translucent copy; while FIG. 6 is a plan view of a third subject holder and which is shown mounted to the fixture by which all three subject holders are removably suspended from the overhead horizontal supporting frame structure;

FIG. 7 is a side elevational view of the mounting fixture and illustrates the subject holder of either FIG. 4, 5 or 6 assembled therewith;

FIG. 8 is a sectional view taken along lines 8—8 of FIG. 6 looking in the direction indicated by the arrows and illustrates one of the pullable indexing means and torque screws by which the subject holder is mounted vertically to its supporting fixture and in a predetermined angular and centered relation to the objective axis;

FIG. 9 is a sectional view taken along lines 9—9 of FIG. 6 looking in the direction indicated by the arrows and shows detail in the construction of the vacuum channel utilized with the subject holder for supporting copy flat thereon;

FIG. 10 is a view taken along lines 10—10 of FIGS. 4 and 6 and illustrates details in the construction of the registration of pins and the crossed vertical axis and horizontal axis supporting plates in which said registration pins of the reflecting copy supporting subject holders are disposed;

FIG. 10a is a view of the registration pin of FIG. 10 shown separated from the subject holder;

FIG. 11 is a fragmented view taken from the objective side of the subject holder of FIG. 6 and illustrates a detail of the releaseable retaining means which locate the copy supporting surfaces of the subject holder in centered relation with the objective axis;

FIG. 12 is a view of the same retaining means taken from the opposite side of the subject holder;

FIG. 13 is a view generally similar to FIG. 11, illustrating the retaining means rotated to a "release" position;

FIG. 14 is another enlarged view of the subject holder of FIG. 6; this view illustrating the manually operated valve through which the copy supporting surfaces of the FIG. 6 subject holder are selectively connected to air evacuating means;

FIG. 15 is a sectional view taken along lines 15—15 of FIG. 6 looking in the direction indicated by the arrows and illustrates the light baffle which is positioned on the rear side of said subject holder;

FIG. 16 is a sectional view taken along lines 16—16 of FIG. 2 and illustrates details in the construction of the mask element and its supporting structure which is disposed between the objective supporting lens board and the film platen to eliminate light spill over to adjacent image portions;

FIG. 17 is a sectional view taken along lines 17—17 of FIG. 16 and illustrates further details in the construction of the latch means for locating the mask element at the film plane of the platen;

FIG. 18 is a view taken along lines 18—18 of FIG. 16 and illustrates the releaseable locking means which secure the bellows of the mask supporting element to the mask supporting frame;

FIG. 19 is a view taken along lines 19—19 of FIG. 3 and illustrates details of the horizontal truing means which are utilized to bring the mounting plate into a horizontal plane and thereby orient the objective and subject holder to the adjusted vertical plane of the film platen;

Figure 20:
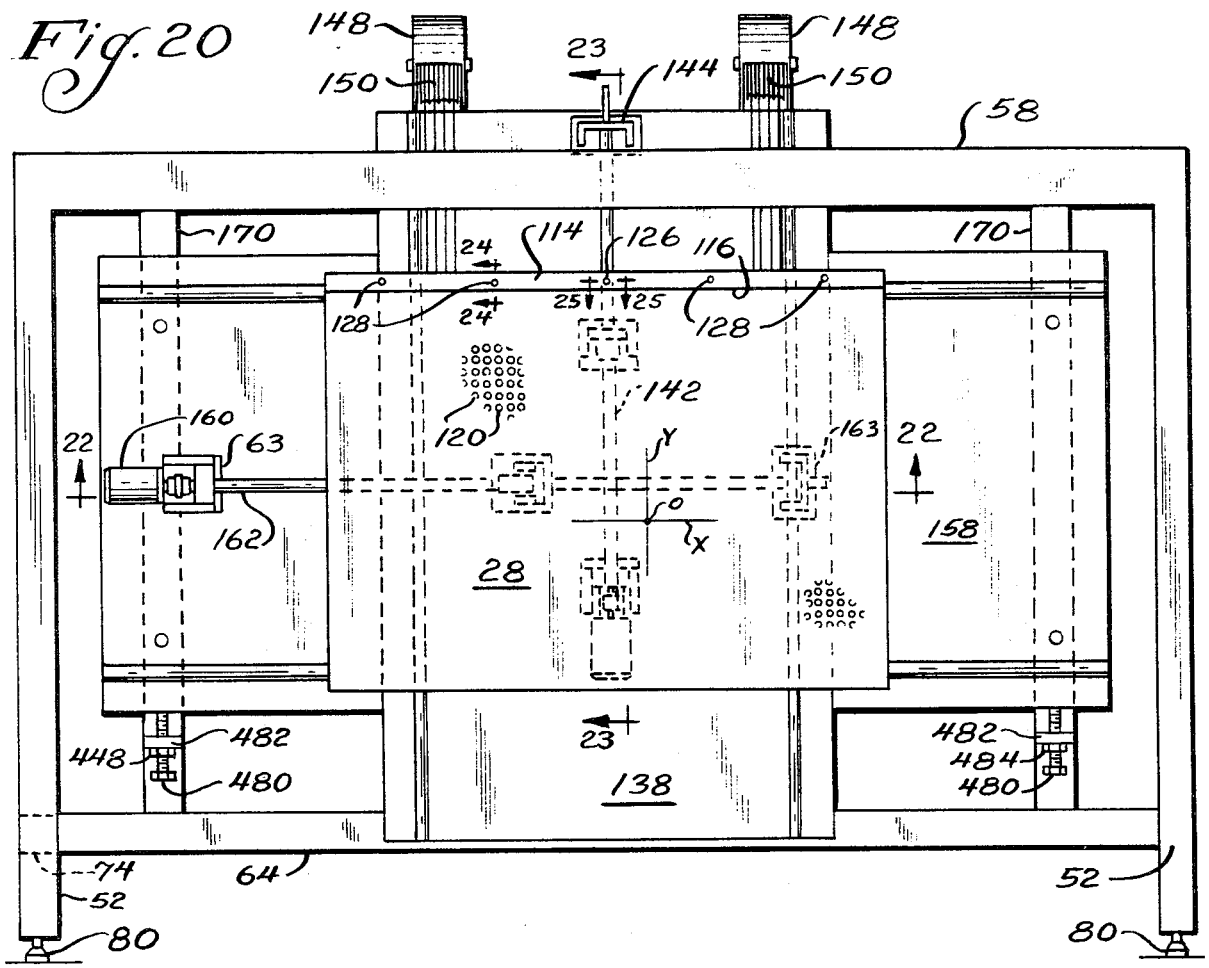
FIG. 20 (sheet 6) is a vertical sectional view taken along lines 20—20 of FIG. 2 and illustrates details of the film platen and means employed for its vertical and horizontal movements.
Figure 21:
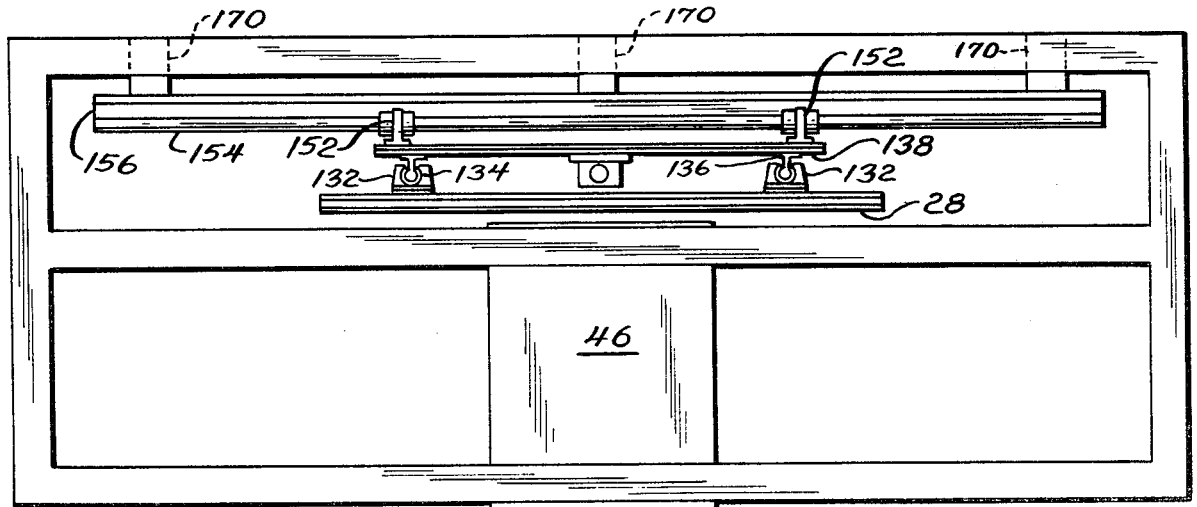
FIG. 21 is a partially fragmented top plan view of the left hand end of the device illustrated by FIG. 2 and shows further details of the film platen and its support.
Figure 29:
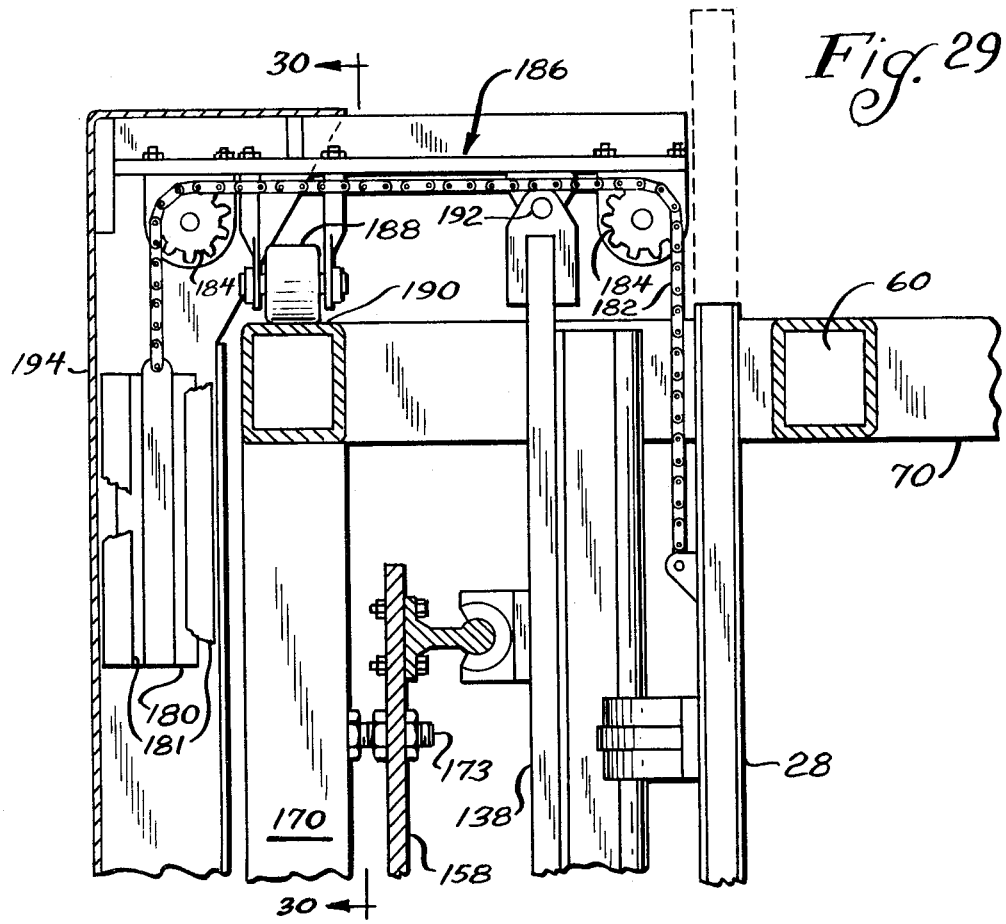
Figure 30:
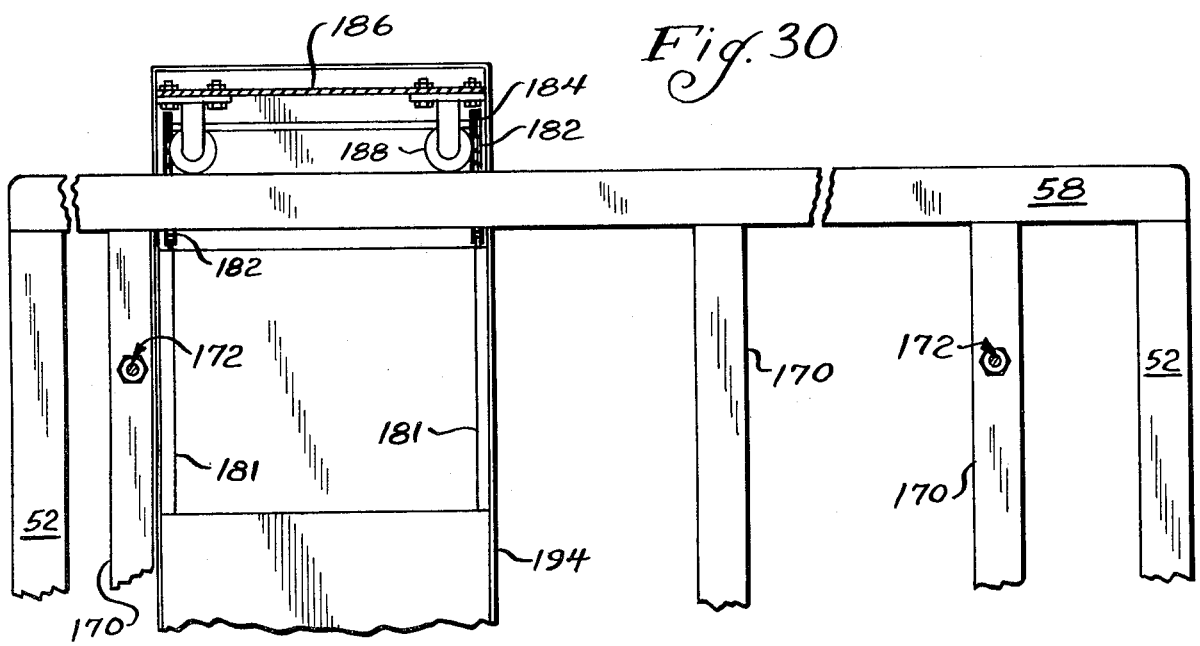

FIG. 24 (sheet 5) is a view taken along lines 24—24 of FIGS. 20 and 26 and illustrates on an enlarged scale details in the construction of the film platen and one of its off-center film registration pins;

FIG. 25 is a view taken along lines 25—25 of FIGS. 20 and 26 and illustrates further details in the construction of said film platen and its on-center film registration pin;

FIG. 27 is a fragmented view taken along lines 27—27 of FIG. 24 looking in the direction indicated by the arrows to illustrate details of the off-center film registration pin;

FIG. 28 is a view taken along lines 28—28 of FIG. 25 and illustrates the cross sectional shape of the on-center registration pin;

FIG. 29 (sheet 7) is a partially fragmented vertical sectional view of the film platen and supporting structure, the view illustrating an alternate construction of the counter-balancing means for the vertical movement of the film platen;

FIG. 30 (sheet 8) is a rear elevational view of the film platen supporting structure of FIG. 29 and illustrates further details of the counterbalancing means there depicted;

FIG. 31 (sheet 7) is a fragmented top plan view of said film platen supporting structure of FIGS. 29 and 30, the view being partially fragmented and showing details of said counterbalancing means;

FIG. 32 (sheet 8) is a plan view of one full size film "flat" produced by the invention;

FIG. 33 (sheet 8) is a schematic view of an operating circuit for the device;

FIG. 34 (sheet 4) is a sectional view taken along lines 34—34 of FIG. 4 and shows details in the construction of the subject holder of said FIG. 4, which construction is essentially duplicated in the opaque subject holder side of the said subject holder illustrated in FIG. 6; and FIG. 35 (sheet 8) is a sectional view taken along lines 35—35 of FIG. 4 (sheet 3) looking in the direction indicated by the arrows.

Referring now more particularly to the several views wherein like parts are identified by like reference numerals, FIGS. 1 and 2 illustrate the invention as including a stepping camera indicated generally at 20. Said camera as there shown comprises an overhead supporting structure 22 from adjacent one end of which depends a subject holder 24 adapted for supporting copy C centered on the axis 0—0 of the camera objective 26 in a plane at right angles to said axis and parallel to a vertical plane in which film F is supported on an indexing platen 28 of the camera. A partitioning wall 30 is assembled about the camera overhead supporting structure 22 in a light-tight relation therewith as later more particularly described. Said partitioning wall 30 extends outwardly therefrom (FIG. 1) to opposite side walls S of a room R in which the camera is located, upwardly to the ceiling (not shown) of the room and downwardly to the floor F thereof so that the platen is contained within a walk-in dark room area DA separated from an illuminated operating area OA in which is contained the subject holder 24 and operating station 32 from which the operator loads copy onto the subject holder 24. Operating station 32 is conveniently located beneath the subject holder and, as illustrated, comprises a table or counter of appropriate size and height on which copy to be loaded onto the subject holder can be stacked in a required sequence and disposition. Station 32 also provides an area to receive copy as it is removed from the subject holder by the operator. Being unattached, station 32 may be adjusted laterally as well as axially of the subject holder to suit the operator's convenience. Within said illuminated operating area is also located the numeric tape control 36 which programs the indexing movement of the platen 28. It also contains the various operating controls which are utilized in accordance with the modus operandi required of the camera. Operating switches for these controls may be located on the partitioning wall 30 and are indicated at 34. The partitioning walls 30 also constitute support for four appropriately located and directed lamps 38 which are so oriented as to front-light copy supported on the subject holder 24.

Considering now FIG. 3 with FIGS. 1 and 2, it will be seen that the aforementioned overhead supporting structure 22 comprises a pair of parallel spaced longitudinal beams 42 of heavy gauge steel tubular stock squared in cross section, united at their opposite ends by butt-welded end closure plates 44. Rested on said beams 42 and bolted thereto as afterwards explained is a mounting plate 46 of one-inch thick heavy sheet aluminum jig plate which serves as mounting support for the elements of the camera other than the film platen 28. The rectangular rigid frame 48 thus defined by longitudinal beams 42, end-closure plates 44 and top plate 46 is supported horizontally at a convenient height to top cross beams bolted to the upper ends of spaced pairs of vertical columns such that the operator can walk erect therebeneath to perform the duties required of him in the operation and maintenance of the camera, both in setting up film and also in loading copy on the subject holder. Said pairs of vertical columns are represented in FIG. 2 at 52, 54 and 56 and their respective cross beams at 58, 60 and 62, both said vertical columns and cross beams being of the same squared heavy gauge steel tubular stock as longitudinal beams 42. Cross braces 64, 66 and 68 of similar steel tubular stock are welded between the respective pairs of said vertical columns adjacent their lower ends such that each pair of vertical columns are rigidly united at their tops and bottom and constitute vertically disposed rectangular frames which do not yield under the weight of beams 42 and the load supported thereby. The first of said frames represented by end columns 52, cross beam 58 and cross brace 64 provides vertical support for the platen 28 as afterwards explained. Said first frame in turn is united by longitudinally extending beams 70 to the second of said frames represented by vertical columns 54, cross beam 60 and cross brace 66 through a pair of longitudinal beams 70 which are end welded to cross beams 58, 60 and further reinforced by cross beam 72 which extend therebetween parallel to cross beams 58, 60. At least one of vertical columns 52 is further united by a further beam 74. The resultant three dimensioned box-like structure 76 in addition to supporting vertical platen 28 also supports the adjacent end of the aforementioned horizontal supporting frame 48 represented by beams 42, end plates 44 and mounting plate 46. Because said box-like supporting structure generically identified at 76 (FIG. 1) is located within the dark room area in which the operator works to set up and remove film from the platen, it has been found preferable to utilize a lower longitudinal beam 74 only on the side of the box-like supporting structure 78 which is away from the operator's normal entrance so as not to handicap the operator's access to the film platen 28. It has been found that the box-like supporting structure 76 is sufficiently rigid without this second bottom longitudinal reinforcing beam. However, it can be included if desired. The third rectangular vertical supporting frame represented by vertical columns 56, cross beam 62 and cross brace 68 supports the opposite end of the horizontal supporting frame 48. As illustrated, the longitudinal beams 42 of said horizontal frame rests atop the cross beam 62 of said vertical supporting frame and is securely bolted thereto; at their opposite end, said beams 42 are illustrated as bolted and dowel-pinned to the underside of cross beam 60 and reinforcing beam 72. As illustrated in FIG. 2, the two pairs of vertical columns 52, 54 of said box-like structure have vertically adjustable feet 80 which are fitted within provided holes in a pair of steel tie bars 82 fastened securely to the floor, one of which is seen in FIG. 2. Adjustment of feet 80 provides a first means in the critical adjustment of platen 28 to a true vertical disposition. They also serve as a means for stabilizing the supporting structure 22 on floor F with which tie bars 82 cooperate to prevent shifting of the supporting structure, once alignment of the vertical columns has been perfected.

As previously mentioned, vertical columns 52 provide support for the platen 28 and its supporting ways as will be later more specifically described. Horizontal mounting plate 46 provides support for the ways along which the objective 26 and the subject holder 24 are adjusted axially of the objective axis relative to each other and to the film platen 28.

In accordance with this invention, means are provided for truing both vertical disposition of the film platen 28 and also horizontal disposition of plate 46 which supports the other camera components including the objective 26 and subject holder 24 so that both copy C and film F will be in parallel planes and the relative movement of the objective 26 and subject holder 24 will be along a common axis 0—0 which is at right angles to said parallel planes. Establishment of the relation is critical to proper imaging and registration. Horizontal adjustment of mounting plate 46 is obtained by adjusting screws 84, 86. As illustrated in FIG. 19, (Sheet 5) center adjusting screws 84 threadedly connect into beam 42 on which plate 46 is rested. Outer adjusting screws 86 adjacent either side of screw 84, however, threadedly connect in plate 46 and abut the upper surface of beam 42. Thus plate 46 may be forced closer to beam 42 by tightening center screw 84 or raised by tightening outer screws 86, it being understood that when either the center screw or the two outer screws are to be tightened the other is correspondingly withdrawn. Adjustment screws 84, 86, as illustrated are located at regular intervals perimetrically of plate 46 wherefore they provide means by which plate 46 can be brought into a precise horizontal disposition.

Referring now paticularly to FIG. 2, objective 26 is shown supported on lens board 90 which slides axially on spaced parallel pairs of guide rods 92 fixed by spaced bearing members 94 to the underside of mounting plate 46. Assuming mounting plate 46 to be disposed exactly horizontal by adjustment screws 84, 86, guide rods 92 are also precisely located so that with movement of lens board 90 therealong object lens 26 remains on axis 0—0 and its path of travel is at right angles to the plane in which copy C is supported on subject holder 24. Rotatably supported in end bearing 96 is a threaded member 98 which threadedly connect with lens board 90 to move the same under the drive of a reversible motor 100 through belt 102 such that lens board 90 may be moved in small increments toward and away from the film platen 28 and conversely from the subject holder 28 to locate the objective at an optimum location for focusing an image of copy on the subject holder to the platen 28 and at a required magnification. A counter device 101 driven by rotation of shaft 98 and located to be visible within the operating area OA indicates the position of the lens. Motor 100 which rotates shaft 98 resists turning of the shaft 92, except when energized. Thus, in its stopped condition, motor 100 constitutes a brake which positively locates the lens board and thereby the objective lens 26 in an adjusted spatial position related to the film platen 28 and subject holder 24.

It is a feature of the invention that lens board 90 and its supported objective 26 are located within a housing or shell 102 the axial length of which at least equals the axial travel of the lens board. The two sidewalls 103 of the shell, one of which is seen in FIG. 2 as mounted to the inner side of beams 42 and are joined by a bottom wall 104. The film platen end of the shell is open; however, its opposite end toward the subject holder is closed by wall member 106 except for rectangular opening 108 which is centered on the objective axis 0-13 0. At 110 is a bellows having one end affixed to the inner side of said wall 106 about said opening 108 and having its opposite side fastened to the lens board 90 about the objective 26. Since partitioning wall 30 abuts the side and bottom walls of the shell 102, as well as the top side of mounting plate 46 and made light tight by bezels 30a, light cannot pass around shell 102 and therethrough only via the bellows 110 and the objective 26 when normally closed shutter element 112 is opened. Thus area DA can be maintained dark and separate from the normally illuminated area OA in which the operator works to operate the camera.

Considering now FIGS. 20 (Sheet 6) and 26 (Sheet 5) with FIG. 2, film platen 28 is illustrated as comprising a rectangular shaped hollow member of opaque aluminum or other rigid inflexible material having a recess 14 along the upper edge thereof in which seats a pin mounting plate 116 with its surface flush with the surface 118 of the platen proper. Both the surfaces of said pin mounting plate 116 and platen are ground and polished to a high degree of flatness. As illustrated, the film platen surface 118 has a plurality of closely spaced perforations 120 communicating with the hollow interior of the platen which, in turn, is connected to a vacuum turbine, not shown. As illustrated best in FIG. 26 (sheet 5), plate 116 supports a plurality of regularly spaced film registration pins which protrude from plate 116. The center one (122) of said pins have opposed flat vertical side surfaces 124 and arcuate-shaped opposed upper and lower surfaces 126. The film registration pins to either side thereof as indicated at 128 also have opposed flat side surfaces 124 and arcuate shaped opposed surfaces 126. However, pins 128 have been rotated 90° to center pin 122 such that their opposed flat sides 124 are horizontally disposed and their arcuate sides vertically disposed. Said pins serve to support the film in an oriented registered relation on the film platen surface 122, the film F having circular pre-punched holes 130, the spacing of which match the spacing of said registration pins. Preferably holes punched in the film are slightly smaller in diameter than the pin diameter such that the film forms a slight meniscus about the flat sides of the pins as the film is drawn tightly against the flat platen surface 118 under the draw of evacuating air through the perforations 130 beneath the film. In their other dimension the pins being slightly smaller than the punched holes, the film is permitted to stretch or shrink in relation to the center pin to compensate for changes in temperature and humidity which are known to affect film stability. The design of the pins thus allows the entire film to adjust on the pins, settle and come to rest and when vacuumized to lie perfectly flat, at the same time being in the required orientation to the platen center.

As earlier explained, it is contemplated that images of copy supported on the subject holder 24 will be reproduced in selected portions I of the film F which images will be precisely arranged in rows and columns accurately spaced to meet the requirements of an imposition. FIG. 32 (Sheet 8) illustrates film F as having two horizontal rows of images I, each row containing four images. It will be understood, however, that the invention can be used to produce any other number of rows and columns of images to satisfy specific requirements, or in any other configuration. To precisely center each of said image portions I on the objective axis 0—0, the plate must be capable of moving both vertically and horizontally while retaining the film in an exact perpendicular relation to the camera axis 0—0, as well as in a plane parallel to the copy on the subject holder 24 with the end result that each selected portion of the film F can be precisely centered on said camera axis 0—0 for exposure of the copy similarly centered on said camera axis by the subject holder 24. Referring therefore next to FIGS. 20-23, platen 28 is provided with spaced parallel runners 132 on its rear side which slidingly engage about vertical extending cylindrical rails 134 supported in vertical spaced parallel relation by T-shaped structures 136 affixed to mounting plate 138. Runners 132 preferably have engagement with rails 134 by means of linear recirculating bearings which provide nearly friction-free vertical sliding movement of the platen 22 relative to the mounting plate 138. Vertical adjustment of the platen 28 along said rails 134 obtains through operation of a first synchronous stepping motor 140 (FIG. 20 and 23) which rotates a threaded shaft 142 supported in bearings 144 and has threaded engagement in member 146 secured to the rear side of the platen 28. Supported atop mounting plate 138 are a pair of spaced housings 148 one of which is seen in FIG. 2. Housing 148 contain counterbalancing springs 149 (FIG. 2) connected to cables 150 which in turn are secured to the top edge of the platen 28 to relieve the weight of the platen 28 on stepping motor 140. Motor 140 is of reversible type and depending on the direction in which motor 140 is operated, threaded shaft 142 is turned clockwise and counterclockwise to effect vertical movement of the platen upwardly and downwardly a distance determined by the pitch of the thread turns and the number of turns the shaft is rotated within member 146.

Figure 22:
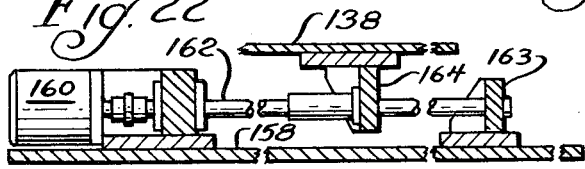
FIG. 22 is a sectional view taken along lines 22—22 of FIG. 20.
Figure 23:
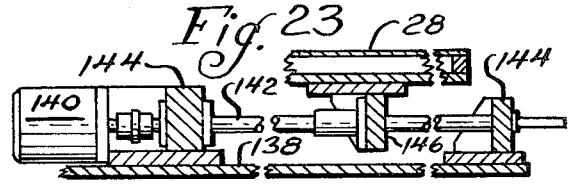
FIG. 23 is a sectional view taken along lines 23—23 of FIG. 20, said FIGS. 22 and 23 illustrating details in the construction of the stepping motors and associated drives by which the film platen is moved horizontally and vertically under the direction of the numeric control.

Vertical mounting plate 138 in turn, as illustrated in FIGS. 2, 20 and 22, is provided with similar runners 152 which through similar linear recirculating bearings engage about and have free sliding contact with horizontally spaced parallel cylindrical rails 154, also supported on the end of T-shaped mounting structures 156 which in turn are secured to a base mounting plate 158. As shown in FIGS. 20 and 22, base mounting plate 158 supports a second stepping motor 160 which rotates a horizontally extending threaded shaft 162 supported in bearings 163 and has threaded connection with member 164 secured to the rear side of the mounting plate 138. Thus rotation of motor 160 effects movement of the platen 28 laterally of the camera axis 0—0 in a horizontal direction at right angles to the direction of movement of the platen obtained by operation of stepping motor 140. Both said platen indexing motors 160 and 140 are under the control of a numeric tape control 36 (FIG. 1) as afterwards explained. Base mounting plate 158 is in turn affixed to vertical beams 170 welded to cross beams 64 and 58 as by adjustable mounting bolts 172. As previously described, vertical columns 52 are initially aligned vertically by adjusting feet 80. Mounting bolts 172 together with jack screws 480 constitute additional means by which the vertical disposition of film platen 28 may be further trued. Mounting bolts 172 as shown comprise a threaded stud 173 affixed to vertical beams 170 and extend through openings provided in the four corners of said base mounting plate 158, said plate 158 being assembled between large nuts and spherical washers, the former being threadedly connected to stud 173 and the spherical washers permitting deliberate angular misalignment of plate 158 which is then corrected by jack screws 480. Jack screws 480 preferably comprise three in number and as illustrated in FIGS. 2 and 20 are threadedly connected in short horizontal plates 482 welded to vertical beams 170 immediately below mounting plate 158 and comprise adjustable rests on which the mounting plate 158 is end supported. By appropriately loosening locknut 484 jack screws 480 may be threaded inwardly or outwardly of horizontal plate 482 to level platen mounting plate 158 and thereby the horizontal axis of platen 28 to a true horizontal disposition. By appropriately threading nuts 174 inwardly or outwardly on stud 173, the assembly of plate 158, and platen 28 may be tilted or otherwise adjusted into an exact vertical disposition and at a required angle to the adjusted horizontal disposition of mounting plate 46. By such means platen 28 can be precisely located in a plane both parallel to the plane in which subject holder 28 supports copy and also at right angles to the objective axis. Thus each portion I of the film F as it is centered on the camera axis 0—0 will assume the same spatial disposition to the objective 26 and inclination to axis 0—0 as does every other portion I of the film.

Referring again to FIG. 26, it will be seen that pin mounting plate 116 is secured to platen 28 by mounting screws 175 which extend through enlarged openings 176 in the pin mounting plate 116. Once the film receiving surface 118 of the platen 28 has been accurately and precisely located in a vertical plane and at right angles to the camera axis 0—0 as through adjustment of feet 80 of the vertical columns and the aforementioned mounting means 172 and 480, said pin mounting plate 116 may be re-adjusted to bring its film registration pins 122 and 128 into a disposition in which the opposed flat vertical sides 124 of center registration pin 122 is exactly vertical and the flat sides 124 of the other registration pins 128 are exactly horizontal. Once this re-adustment has been achieved, plate 116 is fixed in said aligned position by drilling holes therethrough and into the platen surface therebeneath, and inserting dowel pins 178.

Referring now to FIGS. 29 through 31 (sheets 7 and 8) alternate counterbalancing means for platen 28 are illustrated. Such counterbalancing means comprises a counterweight 180 suspended behind vertical columns 52 and beams 172 by a pair of roller chains 182 which extend over sprockets 184 rotatably mounted on the underside of a trolley member 186. The opposite ends of said roller chains being fastened to the back side of the platen 28 as by clevis 187 which allows the platen to be raised to a height above the trolley 186 as indicated in FIG. 29. As illustrated best in FIG. 30, trolley 186 is provided with two pair of spaced rollers 188 which are free to roll along a flat track 190 on the top surface of cross member 58. Trolley 186 being pivotally connected as at 192 to the top of the mounting plate 138 moves laterally with the horizontal adjustment of said mounting plate 138 under the drive of stepping motor 160. As illustrated, the counterbalancing weights may be contained within a shroud 194. Means such as nylon strips 181 may be adjustably mounted on the four vertical corners of the counterweight 180 as illustrated in FIGS. 29 and 30 so as to engage the shroud and prevent swaying during platen movement.

According to this invention the subject holder 28 of the camera can take any one of several forms and sizes, three of which are illustrated by FIGS. 4, 5 and 6 (sheet 3). The invention also includes a novel form of mounting fixture 200 depending from the horizontal supporting frame 22 and on which may be interchangeably supported each of said FIGS. 4, 5 and 6 subject holders. FIG. 4 illustrates an opaque subject holder adapted to support reflection copy. FIG. 5 illustrates a subject holder adapted to support translucent or transparent copy and FIG. 6 illustrates a subject holder having more than one copy supporting surface, each of which may be selectively centered on the objective axis 0—0.

Referring now to FIG. 2, and considering therewith FIGS. 3, 6 and 7, mounting fixture 200 comprises a mounting plate 202 slidably supported on parallel spaced guide rails 204 as by spaced bearings 206. Said rails 204 are supported by mounts 208 to the underside of mounting plate 46 and so arranged that when mounting plate 46 is horizontally disposed, fixture 200 moves in a precisely horizontal path parallel to the axis 0—0 of the camera and at right angles to the vertical plane in which film is supported on the platen 28. Axial movement of the subject holder fixture 200 is obtained by operation of a second motor 210 which through belt drive 211 turns a threaded shaft 212 supported at its opposite ends to the mounting plate 46 as by fixtures 213. Shaft 212 threadedly connects a fixture 214 fixed to said plate 202 of the subject holder mounting fixture so that in accordance with the direction in which shaft 210 is rotated fixture 200 moves toward or away from the objective and the film platen. At 211 is a counter driven by shaft 212 and provides a reading of the spatial setting of the subject holder. Counter 211 like counter 101 from which is read the spatial setting of the objective is conveniently viewable by the operator in area OA.

Bolted at one end of the mounting plate 202 is a depending plate 216 having lateral extensions 217 on opposed sides thereof provided with an inclined surface 218 and a touch plate having a surface 219 inclined at 45 degrees to vertical. On the rear side of said lateral extensions 217 also are pairs of vertically aligned tough members 220, both tough plate and touch members 220 are of hardened steel carefully machined. Said touch members 220 provide a four point contact defining a plane which is exactly parallel to the platen film receiving surface and at right angles to the camera axis. Behind plate 216 and rigidly fastened to plate 202 is a light box 224 having a translucent forward cover 226. Within said light box are a number of illuminatable fluorescent bulbs (not shown) appropriately aligned. The lighted panel 226 is of a dimension and shape to be slightly larger than the largest of the transparent subject holders contemplated being supported on mounting plate 216 as hereinafter more specifically described. It is also centered on the axis 0—0 of the camera.

Referring now more particularly to the subject holders proper illustrated by FIGS. 4, 5 and 6, each said subject holder is illustrated as being comprised of a relatively thick (in the order of an inch or more) cast aluminum or other metal frame 230 which is rigid and unyielding. Within said frames is a copy supporting surface which may be an integral part or assembled with frame 230. Each said subject holder frames 230 comprises a yoke-shaped supporting structure 232 having a pair of upwardly projecting spaced arms 234, each having a hooked shape upper end 236 as illustrated best in FIG. 7. The underside 238 of said upper end 236 is inclined at the aforementioned 45° angle to vertical. Each said upwardly extending arms 234 of the subject holders further have touch portions 238 of hardened steel such that when the subject holder frame 230 is hooked by its portion 236 over the touch elements 219 of fixture 200 from behind, corresponding located touch portions 236 on the forward surface of the subject holder engage with the touch portions of the fixture thus providing means which accurately locate copy supporting surface of said subject holders in a vertical plane paralleling the vertical plane in which the film supporting surface of platen 28 has been located in the set up of the camera. Each of said lateral arms 234 of the subject holders has a pair of horizontally disposed through-openings 240 and 242 which may be aligned with similarly spaced openings 244 and 246 of the fixture plate 216 (FIG. 8). As illustrated in said FIG. 8, opening 246 in the fixture plate 216 is illustrated as smooth surfaced and of slightly larger cross section than is opening 242 in the subject holder which is internally threaded to receive a torque screw 248. It also has a reduced internally threaded outer portion 249 in which torque screw 248 is threadedly mounted to the fixture 200. Both openings 240 in the subject holder arm 234 and opening 244 of the fixture mounting plate 216 have a hardened metal insert liner and are adapted to receive a pullable snugly fitting indexing pin 250 when properly aligned. Thus, in accordance with the invention each of the interchangeable subject holders which are relatively heavy are initially supported on fixture 200 by hooking portions 236 thereof over touch portion 219 of the fixture mounting plate 216. The subject holder is then moved laterally to locate its said openings 240 and 242 in near alignment with openings 244 and 246 of the fixture. Each end of the subject holder is then raised in turn to bring said openings into full alignment and permit insertion of the two indexing pins 262 in aligned openings 242, 244 as illustrated in FIG. 8. With both indexing pins thus inserted, the center of the subject holder copy surface 232 has been precisely located on the camera axis 0—0 and the assembly of the subject holder to its mounting fixture is completed by threadedly connecting torque screw 248 into threaded opening 242 of the subject holder. To dismount the subject holder, the reverse procedure is followed. To wit, the torque screws are loosened and/or removed as are also the indexing pins whereupon the subject holder may be lifted off the inclined touch surfaces represented at 219 for replacement by a second subject holder.

Referring now more particularly to the three illustrated subject holders which are interchangeably mounted on the fixture 200, FIG. 5 illustrates a subject holder wherein frame 230 supports a translucent or transparent rigid panel 260 preferably of a good quality glass the edge of which rests on a recessed ledge 262 of the frame 230 (FIG. 9 - sheet 4) and secured in place so as to leave a channel 264 surrounding transparent copy receiving panel 260, said channel 264 communicating through a provided bore, not illustrated, to hose section 266 connecting to an appropriate vacuum pump. It will be understood that the copy receiving surface 268 of said glass panel 260 has been polished flat as in conventional and, in accordance with this invention so that it defines a plane parallel to the plane which touch portions 238 on arms 234 of its supporting frame define. Spaced at regular intervals along one or more sides of transparent panel 260 and outside channel 264 are registration pins 270 to receive similarly punched copy C shown in phantom lines. In FIG. 5, such registration pins are shown along two sides of the copy receiving surface. However, they could equally well be along 1, 3 or 4 sides to satisfy particular requirements as for example the rigidity of the copy or its lack thereof. Similar pins may be placed on one or more edges of the transparent side of the dual sided subject holder shown in FIG. 6.

Referring now to FIG. 4, the subject holder there illustrated has a copy supporting surface of different construction, although the frame is of approximately the same size and shape. Considering also FIG. 34 (Sheet 4) with FIG. 4, it will be seen that its copy supporting surface 278 is integral with frame 230, that is to say the panel 280 constituting copy surface 278 is cast or formed from the same piece of metal comprising frame 230. It is similarly delineated by a rectangular shaped channel 280 which corresponds to the channel 264 of the FIG. 5 subject holder and its outersurface 278 is ground or polished to a flat parallel to the plane defined by its touch portions 238. The underside of panel 280 has recessed communicating grooves or channels 284 which occupy an area approximately the size and shape of panel 280, or slightly larger, and is closed by a cover 286. Within the rectangular area defined by channel 282, are a pair of right angularly related recesses 288 containing plate members 300 and 302 having their top surfaces 304 flush with the surface 278. Said plates 300 and 302 are so arranged that when the subject holder of FIG. 4 is properly supported on the mounting fixture, as previously explained, their intersection lies on axis 0-0 of the camera, plate 300 being horizontally disposed and plate 302 being vertically disposed. The four quadrants into which the surface 278 is thus divided, contain plural rows of closely spaced perforations 306 which communicate with said channels or grooves 284 which are milled vertically into the back side of panel 280. As illustrated best in FIG. 34, plates 300, 302 also contain a plurality of closely and regularly spaced through openings 308 (for example, one quarter inch center to center spacing) and are adapted to removably receive copy mounting pins 310, one of which is illustrated in FIGS. 10 and 10a. As there shown, each said pins 310 are round in cross section and at least their lower end has a slightly smaller diameter than the receiving opening 308 in plate 300 or 302. Advantageously the pins are of white Delrin or nylon and when fully seated within an opening 308 so as to bottom on the recess surface 312 they protrude to a height in the order of perhaps 1/16 inch to 3/16 inch which is sufficient to pass through the punched holes in the copy C but not so high as to cast a shadow of any substantial size. Being white in color also helps to eliminate shadowing. As illustrated in FIG. 10a the portion 314 of the pin which is received within opening 308 of the plate 300 or 302 is circumferentially channeled at 316 to receive an 0 ring 318 which is slightly greater in cross section than the pin and slightly less than the internal cross section of the receiving hole 308. Therefore the pin when inserted into the hole 308 and bottomed against surface 312 will snugly fit in a predictable normal disposition to surface 278. Removal of the registration pin is easily accomplished as by using a small tool, for example a paper clip, the end of which can be caught in a provided aperture 320 in the protruding portion of the pin.

A feature of the subject holder of FIG. 4 is its adaptability to support different sizes of reflection copy. To support such copy two pins 310 are required, although up to four may be utilized where necessary or found desirable. If two pins are used, they both may be located in either plate 300 or 302, but preferbly to opposite sides of their intersection. If the copy is large enough to lap the outside channel 282, then the orientation pins 310 are located in those holes 308 which are most remote from the intersection of the plates 300 and 302, outside the copy image to be reproduced on the film. Where the copy size is smaller, for example as represented by phantom lines C, a flexible cover element B is utilized to cover channel 282 and the perforations 306 in the four quadrants lying outside the perimeter of the copy. Said cover element B may be either transparent or opaque. As illustrated, said cover B will have outer dimensions large enough that it covers channel 282. It also contains a central cut-out or opening which is slightly smaller than the outside dimensions of the copy C. Therefore, when properly assembled, at least the margins of the copy will lap the cover B as shown in FIG. 4. The orientation pins 310 are located in holes at the proper distance from the inner section of plates 300 and 302 such that they will receive the punched holes in the copy which are outside the copy image area. Usually, this means that the peripheral edge of the cover about its central opening will be notched to engage about the orientation pins without wrinkling. The orientation pins thus serve primarily to orient the copy relative to the intersection of plates 300, 302 corresponding to the optical axis 0—0 of the camera. At the same time, they are also useful to orient the cover B wherefore copy C will lap the cover B and none of the perforations will be exposed to dilute the vacuum pull on the copy.

A further feature of the invention is the value means indicated at 500 (FIGS. 4 and 35) which is manually operable to selectively shut off or establish connection of the evacuating pump to the channel 282 which surrounds the copy support surface of the subject holder. As illustrated best in FIG. 35, valve 500 includes an actuator 502 rotatably supported within the cylindrical bore 504 of the valve body 506. At 508 actuator 502 has a through hole shown parallel to the disposition of its operating handle 510. As illustrated in FIG. 35, the actuator is so positioned that its through hole 508 estblished communication betwen channel 282 and the grooves 284 in the back side of the subject holder through which the vacuum turbine communicates with perforations 306. In the illustrated position of actuator 502, air is therefore evacuated through both the performations and the copy surround channel 282. When actuator 502 is rotated through 90° to its alternate position, said through hole 508 is out of alignment with groove 284 and channel 282 is not connected to the vacuum turbine. Thus valve 500 may be set to evacuate air from the perforations 306 plus channel 282 as when large sized copy is mounted on the subject holder or from only the perforations as when smaller sized copy is mounted thereon.

Referring next to FIG. 6, the subject holder there illustrated is provided with two copy supporting surfaces arranged in side-by-side or tandem relation. One of said surfaces corresponds to copy supporting surface 260 of the FIG. 5 transparent subject holder and is identified at 340. The other corresponds to the opaque copy supporting surface 278 of the subject holder of FIG. 4 and is identified at 344. Copy support 344 is intended for supporting reflection copy and transparent copy support 340 for copy that requires back light. It will be understood, however, that any other construction of copy support may be utilized or either or both of the illustrated copy supports of the FIG. 6 embodiment. For example, both may be opaque for supporting reflection copy, or both may be of the same or of different degrees of translucency.

Referring therefore specifically to FIG. 6, it will be seen that frame 232 contains a rectangular shaped cut-out 330 in which is supported a second frame 332 for sliding movement along a pair of spaced parallel disposed rails 334. As illustrated, the ends of said rails 334 are received within provided openings 336 of the vertical sides of the frame 230 and are intermediately supported as by bearings 336 secured to frame 230. Said frame 332 contains the aforementioned first copy supporting surface 340 which is constructed as described in connection with the subject holder of FIG. 5. It also contains in adjacent relation thereto the aforementioned second or opaque copy supporting surface 344 whose construction corresponds to that of the FIG. 4 subject holder.

A feature of this subject holder is that its copy supports 340 and 344 may be successively and/or optionally centered on the camera axis 0—0. This not only facilitates loading of copy, but it also permits double exposure of an elected image portion I of the film centered by platen 28 on the camera axis 0—0. For example, there are times when it is important to be able to superimpose printed material and also a picture on the same image portion of the film. This is easily accomplished using the subject holder of FIG. 6 by locating the reflection copy of printed material on the opaque support 344 and blanking with black paper or the like the portion thereof which is to receive the picture. The picture which is to be superimposed on the film image is then mounted on the transparent copy support 340 located in the "window" created by the blank area of the "printed" copy masked and surrounded by opaque or black material. Frame 332 is then moved laterally to locate center R of copy support 344 on the camera axis 0—0 and an image thereof reproduced on the axially centered portion of the film. Then without moving the film platen, the transparent copy support 340 can be located with its center K on the camera axis 0—0, back lighted as by energizing the light box 224 and then imposing an image thereof on the same portion of the film. The "front" lights 38 are turned off for this second exposure to insure that the non-image area in the second exposure does not fog the image created by the first exposure.

The invention also utilizes novel means for releaseably locking each of said copy supporting surfaces 340 and 344 with their centers on the optical axis 0—0 of the camera. Thus, as illustrated in FIG. 6, pairs of abutments 346 are located on both the left hand and right hand edges of frame 332 and these are located to engage correspondingly located abutments 348 on the inside vertical edges of frame 230. Said abutments 348 and 346 thus locate the center K of copy support 340 and center R of copy support 344 on axis 0—0 in accordance with the direction in which frame 332 is moved along rails 334.

Referring now to FIGS. 11, 12 and 13 (sheet 4), magnetic locking means are provided for releaseably holding frame 332 in either of said two aligned positions with its abutments 346 against abutments 348. Such locking means comprise an Alnico magnet 350 fixed to the subject holder frame 230 between abutments 348. Similarly located at opposite ends of frame 332 are a pair of steel plates 352 which are located to be brought within the magnetic field of the magnet 350 and held fast thereagainst to lock the frame 332 with the center of the corresponding one of the copy supporting surfaces 340 or 344 centered on the camera axis 0—0. At 354 (FIG. 13) is a shaft loosely supported in a provided opening of mount 356 fixed to the rear side of the subject holder frame 230. The forward end 355 of said shaft lies between frame 230 and frame 332 and is eccentrically shaped such that when manual pressure is applied to handle 357 to rotate shaft 354, said eccentric portion 355 effectively moves frame 332 away from the magnet to interrupt its attraction and permit the frame 332 then to be moved to the opposite end of cut-out 330 as to center the other copy support on the camera axis. As illustrated in FIG. 12, mount 356 is suitably recessed at 360 to provide clearance for movement of portion 359 which connects handle 357 to shaft 356. Said recess also limits the movement of the handle so that it is also conveniently available. Any other suitable releaseable locking means may be utilized in accordance with the invention.

Considering further FIG. 14 with FIG. 6, it will be noted that a manually actuated valve means indicated generally at 364 is fixed to the upper surface of the frame 332 to permit slectively connecting the vacuum pump to the aligned one of the copy supports 340 or 344. Said valve means 364 is illustrated as ported at 366 to conduit 368 which comunicates with perforations 306 in the opaque copy support 344. It also includes a second port 370 spaced from said first port 366 which communicates with a second conduit 372 leading to channel 264 of the transparent copy support 340. At 374 is a third port located intermediate ports 366 and 370 wich comunicates via flexible conduit 366 (FIG. 2, sheet 2) to the air evacuating pump. Valve 364 includes a through cylindrical bore in which snugly fits a similarly shaped movable actuator or gate 378 having enlarged stops or heads 379 which limit movement of the actuator of gate 378 in the valve bore. As illustrated, said actuator 378 has a centrally located reduced section 376 such that in its FIG. 4 illustrated position communication is established between port 374 and port 366 but closing off port 370. In this position of the actuator 378 the pull of the evacuating pump is confined to the perforations and surrounding channel of the opaque copy support 344 as when its center R is on the camera axis 0—0. Said reduced section 376 of the actuator is further dimensioned so that when frame 332 is moved to the position illustrated in FIG. 6 where center K of the transparent copy support 340 is on the camera axis 0—0 the valve gate 378 is manually moved to the right in order to close off port 366 and open port 370 to establish communication of channel 264 of said copy support with the air evacuating pump. Any other construction of valve means may be utilized for selectively connecting each of the copy support to the air evacuating pump while cutting off communication of said pump with the other copy support.

Considering now FIG. 15 (sheet 4) with FIG. 6, a light baffle or shield 380 is secured to the rear side of the subject holder 230 to completely enclose cut-out 330 therein. Said light shield 380, however, is provided with a rectangular shaped opening 382 which is centered on axis 0—0 and corresponds in shape to the transparent panel 340. The dimensions of said opening 382 are the same as or only slightly larger than the dimension of the transparent panel 340. Thus when light box 224 is energized to back light copy positioned on the transparent copy support centered on the axis 0—0 as illustrated in FIG. 6, the surround will be opaque.

Referring now to FIGS. 16, 17 and 18 (sheet 5) with FIG. 2, a further important feature of the invention is the novel supporting structure for a mask which surrounds the path of the projected light rays within the dark room area DA between the objective and film platen to prevent light spill over and consequent fogging with image diminution of portions of the film adjacent to that portion I which is centered by the platen on the camera objective axis 0—0. In FIG. 2, said supporting structure is illustrated generally at 400 and includes a mask mounting board 402 slidably supported at 403 on rails 92, so that it may be moved longitudinally of the camera between the film platen and the objective lens support 90. Said board 402 is illustrated as having an opening 404 centered on axis 0—0 and of a dimensional size greater than the bundle of light rays which are projected from objective 26 to the film platen 28 to form an image thereon. Surrounding said opening 404 is a frame 406 suitably channeled to support an apertured mask 408 with its opening 410 centered on axis 0—0. At 412 is a bellows having an internal diameter at least as large as opening 404 in the mask supporting board 402 and which is secured at one end to an apertured mounting plate 414 and its opposite end to a fixed mount 416, the latter also having a similarly dimensioned opening centered on the axis 0—0. As illustrated in FIG. 2, mount 416 which is fixed to the overheat mounting plate 46 of the rectangular supporting structure 48 is located immediately forward of the objective surround shell 106 and so as to be within the dark area DA. Still referring to FIG. 2, it will be seen that bellows mounting plate 414 is slidably received on a pair of guide rails 420, one end of which is fixed to the mask mounting board 402 and the opposite ends of which are slidably supported in through openings 422 and mount 416.

As illustrated best in FIG. 18, clamping means are provided at 424 for detachably securing said bellows mounting plate 414 to the rear side of the mask supporting board 402. This means is illustrated as comprising four threaded studs 426 each pivotally mounted to the mask mounting board 402 adjacent the four corners of the bellows mounting plate 414. Threadedly supported on studs 426 are clamp heads 430. In said four corners of the bellows mounting plate 414 are slots 432 aligned and so located as to receive studs 426 and thus provide means whereby the baffle mounting plate 414 may be releaseably secured to the mask mounting board 402 as by retightening clamp heads 430 on their respective threaded studs. As seen best in FIG. 16, mask supporting board 402 may be slid along rails 92 to a position remote from the film platen 28 as illustrated in phantom lines in FIG. 2 where it is far enough away from the film platen to provide convenient access by the operator to the platen as is necessary when he is mounting or removing film therefrom. It is important, however, that mask 408 also be located immediately adjacent the film plane in the use of the camera. The invention provides means in the form of a latch indicated generally at 450 in FIG. 2 and shown on a larger scale in FIG. 17 (sheet 5) by which the mask 408 can be releaseably located in said position close to the film. Referring more particularly to FIG. 17, and also FIG. 16, it will be seen that latch 450 includes a latch element 452 supported on a shaft 454 which extends through triangular reinforcement pieces 456 forthe mask mounting board 402. Said shaft has manually graspable handles conveniently affixed to the outer ends thereof. As illustrated in FIG. 17, the upper surface of latch element 452 adjacent its free end contains a notch 456 which under the biasing of spring 462 engages about catch bar 458 which is secured to the underside of a provided cross brace 460 welded to end plate 444 between longitudinal beams 42. Latch element 452 thus serves to locate and positively secure the mask immediately adjacent the film plane. However, by grasping either of handles 464 the operator may rotate shaft 454 and thereby move latch element 452 downwardly against the biasing of spring 462 to move the latch out of engagement with catch bar 458. Mounting board 402 and mask 408 supported thereby then can be moved away from the platen to the aforementioned remote position providing operator access to the platen. The upper leading edge of the latch element 452 is also tapered as at 466 such that when the mask mounting board is returned to the platen said tapered surface 466 under the urging of spring 462 will engage the underside of the catch bar 458 causing the latch element to be depressed and then to engage the catch bar 458 as the notch 456 aligns therewith. At that time the mask supporting structure is relocked in the position illustrated by FIG. 2 and with mask 410 immediately adjacent the film plane.

It is also desirable to make a visual check of the effectiveness of the mask 408 so as to determine whether its aperture 410 is correctly sized to permit a full image of the copy on subject holder 24 to be projected onto the centered portion of the film platen, that is to say an aperture size which does not allow such a large area of light to pass therethrough as to spill over and fog adjacent portions of the film platen or an aperture so small as to prevent the full image from being projected therethrough onto the film platen. This can be conveniently accomplished in accordance with the invention while the mask is held in its latched position adjacent the film plane. This is possible by loosening the aforementioned clamp head 430 of said clamp means on their respective threaded studs 426 which allow the clamps 424 to be swung outwardly as illustrated in FIG. 18 and so freeing the bellows supporting plate 414. Thereafter the bellows plate 414 and the bellows may be slid rearwardly away from the mask mounting board 402 allowing the operator to view the platen through the mask aperture. With shutter 112 open an image of copy on the subject holder therefore can be projected by the objective lens 26 through the mask aperture 410 onto the film plane and its relationship observed. If the aperture 410 does not permit the full image to pass it can be removed and its aperture 410 enlarged the necessary amount. If opening 410, on the other hand is too large, the mask can be either replaced or the size of its aperture 410 reduced, as for example utilizing masking tape 470 as seen in FIG. 16. Once the mask aperture 410 has been correctly sized, then the bellows plate can be returned to adjacent the mask mounting board 402 and secured thereto by swinging the clamp elements 424 back into position and tightening their heads on studs 426.

The operation and utility of the disclosed apparatus is believed to be clear from the above description thereof and also from the several view comprising the drawings to which they make reference. However, a brief review of the operation may be appropriate.

In the preparation of an imposition utilizing the invention, copy for example of book pages are stacked in proper sequence on an operting station 32 to one side of the subject holder for loading thereon. The appropriate one of the three subject holders illustrated in FIGS. 4, 5 and 6 is hung on the fixture 200 as aforedescribed, its center being aligned on the objective by inserting indexing pins 250 through aligned openings 242, 244 of the subject holder and fixture. When thus aligned, torque screw 38 is threaded into opening 246 to secure the subject holder to the fixture and thereby locate its copy mounting surface in a vertical frame parallel to the vertical frame of the platen 28 and centered on the objective axis. The spacing of the subject holder and objective may then be adjusted to obtain focusing of an image of the copy of the film platen of the desired magnification. This is accomplished by operating the respective drive motors therefor as aforedescribed utilizing controls conveniently located in the operator working area A. If exposed film is present on the platen 28, then latch 450 is operated as by handles 460 to permit moving the mask and its mount 402 away from the film platen. The exposed film is then removed, placed in the film processor FP of FIG. 1. New film is then located on the film platen by means of its registration pins 122, 128, the film being drawin into a vertical plane corresponding to the surface of the platen through the pull of the vacuum turbine through the perforations in the film platen surface. To facilitate removal and remounting of film on the film platen the operator may find it convenient to temporarily interrupt the vacuum pull by depressing foot pedal 470. With the film in place, mask mounting board 402 may be then moved back until its latch 450 reengages catch bar 458 and locates the mask 408 in its proper position immediately adjacent the film plane. It will be well at this stage to check whether the mask 408 mounted on the board 402 has a properly sized aperture for the size of image to be projected onto the film. To make this check, bellows plate 414 is pushed away from the mask mounting board 402 after first loosening clamps 450. With the shutter 112 open, an image of copy C on the subject holder 24 may be projectd onto the film platen through the mask aperture and with the bellows and its supporting plate moved back the operator is visually able to check the size of image being focused on the film platen and to make necessary adjustments of the mask aperture. Once this has been accomplished the bellows plate 414 is refastened to the mask mounting board 402. The operator may then leave the dark room area as through a door provided in the separating partition 30 and proceed to load the copy on the subject holder and in turn expose each on the film, which he does by depressing trigger 476. In removing copy from the subject holder, the operator may find it convenient to depress pedal 474 to momentarily interrupt the vacuum pull on the copy as it is being removed. Once each piece of copy has been located on its orientation pins and drawn flat against the subject holder surface the operator initiates the exposure by depressing trigger 476 which is conveniently located on the forward edge of the operating station table 32 immediately below the subject holder. Depressing trigger 476 closes a circuit illustrated in FIG. 33 which serves to initiate a timing circuit 478 to energize both the shutter 112 and then tape control 36 in that sequence. It will be understood that tape control 36 has been previously programmed to operate stepping motors 160 and 140 to move the platen 28 by preselected increments both vertically and horizontally, as previously described such that each of its image portions I is in its turn centered on the axis 0—0 of the camera for exposure. Thus, if an eight page film imposition is to be made it will sequentially locate each of the image portions $I_1 - I_8$ in said center relation. Timing circuit 478 may be so designed that movement of the film platen precedes or follows the shutter opening.

Although the invention thus far has been described as utilizing platen 28 to support film thereon, platen 28 may also be used to support a printing plate on which images of the copy are directly produced without going through the intermediary of first preparing a film. Thus in the appended claims it will be understood that the term "film" as used therein is also intended to include a printing plate or any other member having a light sensitive surface.

It will be appreciated therefore that all the recited objects, advantages and features of the invention have been demonstrated as obtainable in a highly practical apparatus and one that is convenient to operate and requires a minimum of technical skill on the part of the operator.

Thus having described the invention, we claim:

1. In combination, an objective lens having an optical axis, a subject holder having a flat copy supporting side centered on and at right angles to said optical axis, an indexing plate having a side adapted to support film thereon in a plane at right angles to said optical axis, said plate being movable in directions at right angles to said optical axis and parallel to said plane to successively center selected portions of said plate of predetermined size and shape on said optical axis to receive an image of copy on the subject holder when directed by the image forming rays of the objective to said plane on its optical axis, a frame member between the objective and the indexing plate adapted to support a mask having an aperture centered on the optical axis and of a size and shape related to the size and shape of said selected portions of the indexing plate such that when located at a finite distance from the indexing plate immediately adjacent thereto light rays from the objective are limited to the selected portion of the indexing plate centered on the optical axis, said mask supporting frame member being axially retractable from the indexing plate to permit loading and unloading of film, and releaseable latch means for locating the supporting frame member and the mask at said finite distance from the indexing plate.

2. The combination of claim 1 wherein the objective is enclosed within a shuttered light-tight enclosure having an end portion connected to the mask supporting frame member, and at least said connected end portion of the enclosure is movable axially with retraction of the mask supporting frame member from the indexing platen.

3. The combination of claim 2 having locking means which detachably connect the said end portion of the enclosure to the mask supporting frame member, said end portion of the enclosure when detached from the mask supporting frame being independently retractable therefrom.

4. The combination of claim 3 further including rails along which the mask supporting frame member and end portion of the enclosure are separately and collectively slidable axially between the objective and indexing plate.

5. The combination of claim 4 wherein the end portion of the enclosure comprises a bellows having an aperture mounting board which releaseably connects to the mask supporting frame member and slides along said rails, said mounting board carrying the locking means which detachably connect it to the mask supporting frame member.

6. In a certain having a subject holder on which to support copy in a reference plane, an objective having an optical axis intersecting said reference plane at right angles, and an indexing plate on which to support film or a printing plate parallel to said reference plane and which indexing plate is movable through a plane parallel to said reference plane to successively center selected portions of the film or printing platen on said optical axis and maintain each in the same parallel relation to the reference plane, the improvement wherein the subject holder has registration pins for accurately orienting punched copy thereon relative to the optical axis and the indexing plate has spaced non-circular registration pins along one edge over which punched film or printing plate is mounted, the non-circular registration pins of the indexing plate having at least two parallel flat sides in parallel relation to the optical axis, said parallel flat sides of at least one of said non-circular registration pins being in transverse relation to the parallel flat sides of other of said non-circular registration pins, and both the indexing plate and subject holder having vacuum means for effectively holding the oriented copy and film or printing plate on the subject holder and indexing platen parallel to said reference plane.

7. In a camera having a subject holder on which to support copy in a reference plane, an objective having an optical axis intersecting said reference plane at right angles, and an indexing plate on which to support film or a printing plate parallel to said reference plane, and which indexing plate is movable through a plane parallel to said reference plane to successively center selected portions of the film or printing plate on said optical axis and parallel to said reference plane, the improvement wherein the subject holder has a flat face to receive the copy and in which face are two straight lines of spaced registration pin mounting holes intersecting each other at right angles, means for locating the subject holder with said intersection on the optical axis of the objective, registration pins seated in at least two of said mounting holes over which punched copy is located to orient the same relative to the optical axis, the subject holder having air evacuating means in said face over which the oriented copy is located for withdrawing air from beneath the oriented copy to draw and hold the copy against said face and in the said reference plane.

8. The improvement of claim 7 wherein the indexing plate also has spaced registration pins along at least one edge over which the similarly spaced holes of a film or printing plate is mounted.

9. The improvement of claim 7 wherein the indexing plate has spaced non-circular registration pins along one edge over which similarly spaced holes of a punched film or printing plate is mounted, the non-circular registration pins of the indexing plate having at least two parallel flat sides in parallel relation to the optical axis, said parallel flat sides of at least one of said non-circular registration pins being in transverse relation to the parallel flat sides of other of said non-circular registration pins.

10. The improvement of claim 7 wherein the mounting holes have a constant diameter only slightly less than the diameter of the lower portion of the pins which extend within said mounting holes, said lower portions having compressible means thereabout so that the pins snugly seat in the holes.

11. The improvement of claim 10 wherein the upper protruding portion of the pins has aperture means by which the pins may be caught to facilitate removal from a mounting hole.

12. The improvement of claim 7 wherein the face of the subject holder contains a rigid member embodying two right angular crossed plates having a flat outer surface flush with that of the subject holder face and containing the two lines of spaced registration pin mounting holes, said mounting holes being of constant depth and blind, one line of holes being along the horizontal center axis of the subject holder and the other line of holes being along the vertical center axis thereof.

13. The improvement of claim 6 wherein the registration pins of the indexing plate are fixed in a provided longitudinal member seated flush in the upper edge portion of the indexing plate, said longitudinal member being secured to the indexing plate by screws extending through oversized openings in the longitudinal member accommodating adjustment of the longitudinal member to locate its line of registration pins parallel to the line of registration pins of the subject holder and means securing said longitudinal member to the indexing plate against movement from said adjusted position.

14. In a camera having a subject holder on which to support copy in a reference plane, an objective having an optical axis intersecting said reference plane at right angles, and a plate on which to support film or a printing plate parallel to said reference plane, the improvement wherein the subject holder has a flat face to receive the copy and in which face are two straight lines of spaced registration pin mounting holes intersecting each other at right angles and dividing the subject holder face into four quadrants, means for locating the subject holder with said intersection in the optical axis of the objective, and registration pins removably seated in at least two of said mounting holes over which punched copy is located to orient the same relative to the optical axis, each said quadrants of the subject holder face containing a plurality of perforations over the area connectible to an air evacuating source, and a removable cover sheet having outer dimensions approximating that of the subject holder face and a rectangular-shaped opening only slightly smaller than the copy to be mounted on said face so as to close those perforations outside the copy receiving area of the subject holder face when the copy is oriented by said pins relative to the optical axis of the camera objective.

15. The improvement of claim 14 wherein the removable cover sheet has a pair of openings related to its center through which the removable registration pins protrude to center the cover on the subject holder face and receive the copy.

16. Mounting means for orienting copy on a vacuum subject holder provided with a receiving blind hole in the copy receiving face of the subject holder for said mounting means, said mounting means comprising a pin generally round in cross section and having a lower portion of a diameter only slightly less than the diameter of said receiving blind hole, the lower portion of the pin having a peripherally extending channel thereabout and a compressible O-ring seated in said channel, the O-ring having an outer diameter only slightly greater than the diameter of the receiving hole such that the pin may be located with its lower portion into the hole to the bottom thereof and the pin snugly held and centered therein by the O-ring, the protruding outer portion of the pin having a transverse opening in which a tool may be caught for pulling the pin from its snug fit within the hole, the exposed outer surface of the upper portion of the pin being smooth, round and otherwise uninterrupted to facilitate assembly of copy thereof.

17. The mounting means of claim 16 wherein the upper portion of the pin is cylindrical in shape, relatively short in height and white in color to minimize shadowing of copy during illumination of the subject holder.

18. In combination, an objective, a vertically disposed subject holder and an overhead-supported fixture to which the subject holder is removably assembled to support copy in alignment with the objective and in a plane at right angles to its optical axis, the fixture having vertical surface aligning means disposed above and defining a plane at right angles to said optical axis and also touch means spaced above said vertical surface aligning means, the subject holder having vertical alignment surface means above its center and defining a plane parallel to its copy supporting surface, the subject holder further having overhang means which are rested on said touch means to locate the subject holder alignment surface means against the aligning surface means of the fixture, said subject holder and fixture further having pairs of alignment openings therethrough, the alignment openings of the fixture being precisely related to each other and to the optical axis and the alignment openings of the subject holder being correspondingly spaced relative to each other and to a predetermined center point which is to lie on the optical axis when the subject holder is properly supported on the fixture, indexing pins for insertion through aligned pairs of said alignment openings of the subject holder and fixture to horizontally locate said center point of the subject holder on the optical axis when the subject holder is assembled by the hanger means on the touch means of the fixture, and fastening means for securing the subject holder in said aligned position on the fixture.

19. The combination of claim 18 wherein the touch means comprises an inclined surface and the hanger means of the subject holder comprise a similarly inclined surface.

20. The combination of claim 19 wherein the fastening means comprises a pair of torque screws on one of said fixture and subject holder which threadedly connect into internally threaded openings in the other of said fixture and subject holder.

21. In a camera having a subject holder on which to support copy in a reference plane, an objective having an axis intersecting said reference plane at right angles, and a film platen on which is supported film parallel to said reference plane, the improvement wherein the subject holder includes a first member embodying a pair of juxtaposed flat copy supporting surfaces of different light transmitting characteristics disposed at said reference plane and having associated air evacuating means for drawing copy positioned thereon flat and in the reference plane, the subject holder having transverse guide means along which said first member moves parallel to said reference plane, between a pair of positions in one of which positions one copy supporting surface is centered on the lens axis and in the other of which positions the other copy supporting surface is centered on the lens axis, and releaseable retaining means for retaining the first member in said positions.

22. The improvement of claim 21 wherein the subject holder has registration means associated with each said copy supporting surfaces.

23. The improvement of claim 21 wherein one of said copy supporting surface is light transmitting and has an imperforate copy receiving area and a surrounding air evacuating channel.

24. The improvement of claim 23 wherein the other of said copy supporting surfaces is opaque and has a plurality of air evacuating perforations.

25. The improvement of claim 20 having means which selectively connect the evacuating means of one of said copy supporting surfaces to an air evacuator and interrupt connection of the air evacuating means of the other copy supporting surface to said air evacuator.

26. The improvement of claim 24 wherein said opaque copy supporting surface also has a surrounding air evacuating channel.

27. The improvement of claim 21 wherein the releasable retaining means comprises a magnetic catch which holds the first member in one of its position by magnetic attraction, and lever-operated means of moving the first member out of the field of attraction of the magnetic catch.

28. In a camera, the combination of an overhead rigid rectangular frame horizontally supported on pairs of reinforced vertical columns at its opposed ends, a supporting plate on said rigid rectangular frame, a lens board mounted on the underside of said supporting plate for movement axially thereof, an objective supported by the lens board with its axis parallel to the direction in which the lens board moves, a subject holder mounted on the underside of said supporting plate at one end of said rigid rectangular frame for supporting copy in a vertical plane at right angles to said supporting plate and centered on the objective axis, an indexing platen mounted vertically on a pair of said vertical columns at the opposite end of said rigid rectangular frame for supporting film in a vertical plane to receive an image of copy on the subject holder focused by the objective along its axis thereto, the indexing platen being adjustable in programmable amounts to move film supported thereon through said vertical plane to successively center selected portions of the film on the objective axis, and adjustment means spaced perimetrically of the supporting plate which provide a vertically adjustable bearing and supporting relation between the supporting plate means and the rigid rectangular frame on which the supporting plate means rests, said adjustment means permitting truing of the horizontal disposition of the supporting plate means on the rigid rectangular frame such that copy supported on the subject holder can be disposed parallel to film supported on the indexing platen and, the subject holder being at right angles to the objective axis, the subject holder and objective can be moved axially relative to each other and to the indexing platen without changing the angular and centered relation of the objective axis to the subject holder and indexing platen to assure proper imagery and registration.

29. The combination of claim 28 wherein the adjustment means comprise groups of members located at regular intervals spaced perimetrically about the supporting plate means, at least one member of each said groups having threaded engagement with the supporting plate means and bearing engagement with the rigid rectangular frame and another member of each said groups having threaded engagement with the rigid rectangular frame and bearing engagement with the supporting plate means.

30. An overhead camera comprising in combination, an overhead support embodying a rigid rectangular closed frame supported horizontally on spaced pairs of vertical columns and including a housing fixed to the underside of said closed frame, a lens board mounted on the underside of said frame within said housing for movement longitudinally of the overhead support, an objective mounted over a provided opening in said lens board for movement with the lens board in a direction paralleling its axis, a subject holder supported by said closed frame at one end of the housing for supporting copy in a plane at right angles to said objective axis, a film supporting platen mounted vertically on the opposite side of said housing in a plane parallel to the plane in which the subject holder supports copy, said housing being closed on its top side by the closed frame, its other three sides and one end wall being closed except for an open area in said end wall about the objective axis, adjustable light baffle means within said housing secured at one end to the lens board about the objective and to said housing end wall about said open area, fixed light baffle means disposed vertically about the closed horizontal frame and housing which extend to the enclosing walls of the area in which the camera is utilized and normally closed shutter means over said opening of the lens board such that the area beneath the horizontally disposed frame can be illuminated without illuminating the area on the opposite side of the housing containing the film supporting platen.

31. In a camera having a subject holder on which to support copy in a reference plane, an objective having an optical axis intersecting said reference plane at right angles, and an indexing plate on which to support film or a printing plate parallel to said reference plane, and which indexing plate is movable through a plane parallel to said reference plane to successively center selected portions of the film or printing plate on said optical axis and parallel to said reference plane, the improvement wherein the subject holder has a flat face to receive the copy and spaced registration pin over which the holes of punched copy and located to orient the same relative to the optical axis, the subject holder face containing a plurality of closely spaced perforations and a surrounding channel through which air is drawn from beneath the oriented copy to draw and hold the copy against said face and in the said reference plane, and valve means by which an air evacuating pump may be connected to the channel alone or also to the perforations.

32. In a camera having a subject holder on which to support copy in a reference plane, an objective having an optical axis intersecting said reference plane at right angles, and an indexing plate on which to support film or a printing plate parallel to said reference plane, and which indexing plate is movable through a plane parallel to said reference plane to successively center selected portions of the film or printing plate on said optical axis and parallel to said reference plane, the improvement wherein the subject holder has a flat face to receive the copy and spaced registration pins over which the holes of punched copy are located to orient the same relative to the optical axis, the subject holder face containing a plurality of closely spaced perforations and a surrounding channel through which air is drawn from beneath the oriented copy to draw and hold the copy against said face and in the said reference plane, and valve means by which air evacuating means may be connected to the perforations alone or also to the

* * * * *

UNITED STATES PATENT OFFICE
CERTIFICATE OF CORRECTION

PATENT NO. : 3,998,546
DATED : Dec. 21, 1976
INVENTOR(S) : Joseph H. Wally, Jr. et al.

It is certified that error appears in the above-identified patent and that said Letters Patent are hereby corrected as shown below:

| | | |
|---|---|---|
| Column 5, line 16, | Change "plane" to --plan--; |
| Column 10, lines 3 & 4, | Change "axis 0-13 0." to --axis 0-0.--; |
| line 20, | Change "recess 14" to --recess 114--; |
| Column 12, line 14, | After "plate 158," insert --138--; |
| Column 13, line 41, | Change "tough" to --touch--; |
| Column 14, line 60, | After "to" insert --a--; |
| line 64, | Change "flat as in" to --flat as is--; |
| Column 16, line 37, | Change "value" to --valve--; |
| Column 17, line 3, | Change "light." to --lighting.--; |
| Column 19, lines 36,37, | Change "overheat" to --overhead--; |
| Column 23, line 13, | Change "a certain" to --a camera--; |
| Column 26, line 22, | Before "evacuating" insert --air--; |
| line 31, | Change "position" to --positions--; |
| line 32, | Change "of" to --for--; |
| Column 28, line 12, | Change "and" to --are--; |
| line 40, | After "the" add --channel.--. |

Signed and Sealed this

First Day of March 1977

[SEAL]

Attest:

RUTH C. MASON
*Attesting Officer*

C. MARSHALL DANN
*Commissioner of Patents and Trademarks*